(12) United States Patent
Banister et al.

(10) Patent No.: US 7,219,131 B2
(45) Date of Patent: May 15, 2007

(54) ELECTRONIC MESSAGE DELIVERY USING AN ALTERNATE SOURCE APPROACH

(75) Inventors: Scott Banister, Pacifica, CA (US); Paul Clegg, San Mateo, CA (US); Peter Schlampp, San Francisco, CA (US); Patrick R. Peterson, San Francisco, CA (US)

(73) Assignee: IronPort Systems, Inc., San Bruno, CA (US)

( * ) Notice: Subject to any disclaimer, the term of this patent is extended or adjusted under 35 U.S.C. 154(b) by 0 days.

(21) Appl. No.: 10/347,055

(22) Filed: Jan. 16, 2003

(65) Prior Publication Data

US 2004/0199595 A1    Oct. 7, 2004

(51) Int. Cl.
*G06F 15/16*    (2006.01)

(52) U.S. Cl. ..................... 709/206; 709/202
(58) Field of Classification Search ........ 709/201–207, 709/217–219, 227–229
See application file for complete search history.

(56) References Cited

U.S. PATENT DOCUMENTS

| | | | |
|---|---|---|---|
| 5,319,776 A | 6/1994 | Hile et al. | |
| 5,623,600 A | 4/1997 | Ji et al. | |
| 5,802,178 A | 9/1998 | Holden et al. | |
| 5,805,810 A | 9/1998 | Maxwell | |
| 5,822,526 A * | 10/1998 | Waskiewicz | 709/206 |
| 5,832,208 A | 11/1998 | Chen et al. | |
| 5,889,943 A | 3/1999 | Ji et al. | |
| 5,915,087 A | 6/1999 | Hammond et al. | |
| 5,937,162 A * | 8/1999 | Funk et al. | 709/206 |
| 5,958,005 A | 9/1999 | Thorne et al. | |
| 5,968,176 A | 10/1999 | Nesset et al. | |
| 5,983,270 A | 11/1999 | Abraham et al. | |
| 5,983,350 A | 11/1999 | Minear et al. | |
| 5,999,967 A | 12/1999 | Sundsted | |

(Continued)

FOREIGN PATENT DOCUMENTS

| | | |
|---|---|---|
| EP | 0899918 A | 3/1999 |
| JP | 2000 339236 A | 8/2000 |
| WO | WO 01/67330 A1 | 9/2001 |
| WO | WO 02/25464 A1 | 3/2002 |
| WO | WO 02/39356 A1 | 5/2002 |
| WO | WO 02/19069 A | 7/2002 |

OTHER PUBLICATIONS

Nicholas, "Realtime Blackhole List", Feb. 2, 2000, http://mail-abuse.org/rbl/spamware.htm.*

(Continued)

*Primary Examiner*—Bunjob Jaroenchonwanit
*Assistant Examiner*—Victor Lesniewski
(74) *Attorney, Agent, or Firm*—Hickman Palermo Truong & Becker LLP; Christopher J. Brokaw

(57) ABSTRACT

Message delivery approaches in which senders define filters with associated actions for evaluation in relation to specified messages. After creating and storing filters with specified actions, senders dispatch messages to a processing system, which evaluates the filters against the messages. If a match occurs, the processing system performs the specified actions on the messages. The processing system may send the same message multiple times to different receiving systems, and may modify the source IP address and outbound interface of the message for each receiving system. The source IP address or interface may be modified by a filter in response to external events, such as a receiving system blocking another copy of the message. A single message processing system can appear as a large number of virtual message sendingunits.

56 Claims, 7 Drawing Sheets

U.S. PATENT DOCUMENTS

| | | | |
|---|---|---|---|
| 6,003,084 | A | 12/1999 | Green et al. |
| 6,052,709 | A | 4/2000 | Paul |
| 6,072,942 | A | 6/2000 | Stockwell et al. |
| 6,131,110 | A | 10/2000 | Bates et al. |
| 6,161,129 | A * | 12/2000 | Rochkind .................. 709/206 |
| 6,161,130 | A | 12/2000 | Horvitz et al. |
| 6,192,114 | B1 | 2/2001 | Council |
| 6,195,587 | B1 | 2/2001 | Hruska et al. |
| 6,212,558 | B1 | 4/2001 | Antur et al. |
| 6,226,670 | B1 * | 5/2001 | Ueno et al. ................. 709/207 |
| 6,233,618 | B1 | 5/2001 | Shannon |
| 6,266,664 | B1 | 7/2001 | Russell-Falla et al. |
| 6,266,692 | B1 * | 7/2001 | Greenstein ................. 709/206 |
| 6,289,105 | B1 | 9/2001 | Murota |
| 6,330,590 | B1 | 12/2001 | Cotton |
| 6,341,309 | B1 | 1/2002 | Vaid et al. |
| 6,377,936 | B1 * | 4/2002 | Henrick et al. ............. 709/206 |
| 6,393,568 | B1 | 5/2002 | Ranger et al. |
| 6,408,336 | B1 | 6/2002 | Schneider et al. |
| 6,421,709 | B1 | 7/2002 | McCormick et al. |
| 6,434,600 | B2 * | 8/2002 | Waite et al. ................. 709/206 |
| 6,460,050 | B1 | 10/2002 | Pace et al. |
| 6,484,261 | B1 | 11/2002 | Wiegel |
| 6,502,131 | B1 | 12/2002 | Vaid et al. |
| 6,507,866 | B1 | 1/2003 | Barchi |
| 6,539,430 | B1 | 3/2003 | Humes |
| 6,574,658 | B1 * | 6/2003 | Gabber et al. ............. 709/206 |
| 6,587,550 | B2 | 7/2003 | Council et al. |
| 6,591,291 | B1 * | 7/2003 | Gabber et al. ............. 709/206 |
| 6,609,196 | B1 | 8/2003 | Dickinson, III et al. |
| 6,650,890 | B1 | 11/2003 | Irlam et al. |
| 6,654,787 | B1 | 11/2003 | Aronson et al. |
| 6,675,162 | B1 | 1/2004 | Russell-Falla et al. |
| 6,732,157 | B1 | 5/2004 | Gordon et al. |
| 6,785,732 | B1 | 8/2004 | Bates et al. |
| 6,894,981 | B1 | 5/2005 | Coile et al. |
| 7,047,280 | B2 * | 5/2006 | Hall et al. .................. 709/206 |
| 7,054,906 | B2 * | 5/2006 | Levosky ..................... 709/206 |
| 7,065,555 | B2 * | 6/2006 | Foulger et al. ............. 709/206 |
| 7,139,825 | B2 * | 11/2006 | Andaker et al. ........... 709/207 |
| 2001/0005885 | A1 | 6/2001 | Elgamal et al. |
| 2002/0016824 | A1 | 2/2002 | Leeds |
| 2002/0087641 | A1 * | 7/2002 | Levosky ..................... 709/206 |
| 2002/0133469 | A1 | 9/2002 | Patton |
| 2002/0133625 | A1 | 9/2002 | Hall et al. |
| 2002/0152272 | A1 * | 10/2002 | Yairi ......................... 709/206 |
| 2002/0184315 | A1 | 12/2002 | Earnest |
| 2002/0199095 | A1 | 12/2002 | Bandini et al. |
| 2003/0050988 | A1 | 3/2003 | Kucherawy |
| 2003/0079142 | A1 | 4/2003 | Margalit et al. |
| 2003/0093689 | A1 | 5/2003 | Elzam et al. |
| 2003/0097591 | A1 | 5/2003 | Pham et al. |
| 2003/0110224 | A1 | 6/2003 | Cazier et al. |
| 2003/0149726 | A1 | 8/2003 | Spear |
| 2003/0158905 | A1 | 8/2003 | Petry et al. |
| 2003/0167402 | A1 | 9/2003 | Stolfo et al. |
| 2003/0172050 | A1 | 9/2003 | Decime et al. |
| 2003/0172291 | A1 | 9/2003 | Judge et al. |
| 2003/0200334 | A1 * | 10/2003 | Grynberg ..................... 709/206 |
| 2003/0229717 | A1 * | 12/2003 | Teague ........................ 709/246 |
| 2004/0019648 | A1 * | 1/2004 | Huynh et al. ................ 709/206 |
| 2004/0019651 | A1 | 1/2004 | Andakar |
| 2004/0054742 | A1 | 3/2004 | Gruper et al. |
| 2004/0058673 | A1 | 3/2004 | Irlam et al. |
| 2004/0064371 | A1 | 4/2004 | Crapo |
| 2004/0073617 | A1 | 4/2004 | Miliken et al. |
| 2004/0083230 | A1 | 4/2004 | Caughey |
| 2004/0093384 | A1 | 5/2004 | Shipp |
| 2004/0167968 | A1 | 8/2004 | Wilson et al. |
| 2004/0215977 | A1 | 10/2004 | Goodman et al. |
| 2004/0260922 | A1 | 12/2004 | Goodman et al. |
| 2005/0005107 | A1 | 1/2005 | Touboul |
| 2005/0064850 | A1 | 3/2005 | Irlam et al. |
| 2005/0071485 | A1 | 3/2005 | Ramagopal |
| 2005/0080856 | A1 | 4/2005 | Kirsch |
| 2005/0108518 | A1 | 5/2005 | Pandya |
| 2005/0182959 | A1 | 8/2005 | Petry et al. |
| 2005/0193429 | A1 | 9/2005 | Demopoulos et al. |

OTHER PUBLICATIONS

Sullivan, "Buffalo Spammer' Sentenced to 3-½ to 7 Years" May 27, 2004, http://news.yahoo.com/news?tmpl=story&u=/nm/20040527/us_nm/tech_spam_dc_6.*

"Prevention of Forged-Spam email via Sendmail (Relay Disable)" http://docsrv.sco.com/MM_admin/mmadminC.spam_forge.html, Nov. 1999.*

Gopal, Ram D.; Walter, Zhiping; and Tripathi, Arvind K., "Admediation: New Horizons in Effective Email Advertising," Communications of the ACM, ACM Press, Dec. 2001, vol. 44, Issue 12, pp. 91-96.*

Mazieres, David; and Kaashoek, M. Frans, "The Design, Implementation and Operation of an Email Pseudonym Server," Proceedings of the 5th ACM Conference on Computer and Communications Security (CCS) 1998, ACM Press, Nov. 1998, pp. 27-36.*

International Searching Authority, "Notification of Transmittal of the International Search Report and the Written Opinion of the International Searching Authority, or the Declaration," Aug. 13, 2004, 10 pages.

Current Claims in International Application, application No. PCT/US04/00969, 19 pages.

Declan McCullagh, "Spam Blocker charges for e-mail," Feb. 19, 2003, http://news.com.com/2100-1023-985175.html, printed Feb. 19, 2003, pp. 1-3.

Robert Lemos, "Paying up for a spam seal of approval," Jun. 24, 2002, http://news.com.com/2100-1001-938976.html, printed Feb. 19, 2003, pp. 1-3.

Cashramspam.com, "CashRamSpam.com," file://C:\DOCUME~1\LOCALS~1\temp\20JL2VHO.htm, printed Feb. 19, 2003, 9 pages.

International Searching Authority, "Notification of transmittal of the international search report and the written opinion of the international searching authority, or the declaration," international application No. PCT/US2005/005498, dated May 18, 2005, 12 pages.

Current Claims, PCT/US2005/005498, 14 pages.

Avery, Mike, "Networking: Product Reviews: MimeSweeper neatly cleans up e-mail Web Content," Info World Jun. 23, 1997, reproduced by High Beam Research LLC., 3 pages. (Reference on CD-ROM).

"Check Point Firewalls," [Online], retrieved from the internet URL: <http://www.trellisnet.com/Security/Checkpoint/firewalls.asp>, Trellis Network Services, Retrieved on May 18, 2004, pp. 1-3. (Reference on CD-ROM).

"Check Point Signs Technology licensing Agreement with RSA Data Security," Check Point Software Technologies LTD., Sep. 18, 1995, 2 pages. (Reference on CD-ROM).

"Check Point Software technologies to Secure Backweb's Internet Broadcasting Software," Check Point Software Technologies LTD., reproduction of article from Internet World dated Dec. 11, 1996, 2 pages. (Reference on CD-ROM).

"Control Data Systems Partners With Check Point Software To Resell FireWall-1," Check Point Software Technologies LTD., Feb. 21, 1996, 2 pages. (Reference on CD-ROM).

International Searching Authority, "Notification of Transmittal of the International Search Report and the Written Opinion of the International Searching Authority, or the Declaration," PCT/US04/00969, Aug. 18, 2004, 10 pages. (Reference on CD-ROM).

Current Claims in PCT patent application, International Application No. PCT/US03/37417, 16 pages. (Reference on CD-ROM).

International Searching Authority, "Notification of Transmittal of the International Search Report or the Declaration," PCT/US03/37417, Jun. 8, 2004, 7 pages. (Reference on CD-ROM).

Declude, "List of All Known DNS-based Spam Databases," Apr. 20, 2004, http://www.declude.com/Articles.asp?ID=97, data retrieved Jun. 27, 2005, pp. 1-21. (Reference on CD-ROM).

Dwork, Cynthia, et al., "Pricing via Processing or Combatting Junk Mail," Draft of full version, preliminary version of this paper was presented at Crypto '92, pp. 1-11. (Reference on CD-ROM).

eSOFT.COM, "InstaGate EX2-the Firewall with a Future," eSoft Incorporated, 2001, 9 pages. (Reference on CD-ROM).

"eTrust Secure Content Manager," Computer Associates International Inc., 2003, pp. 1-7. (Reference on CD-ROM).

"Fighting Fire with Fire," Computer Reseller News, n757, pp. 143-152, Oct. 6, 1997, 14 pages. (Reference on CD-ROM).

"F-Secure Internet Gatekeeper," F-Secure Data Sheet, F-Secure Corporation, 2 pages. (Reference on CD-ROM).

Google Groups, "MIME mail bombs," Message 1 thread from Selden E. Ball Jr., dated Feb. 28, 1995, 3 pages. (Reference on CD-ROM).

Google Groups, "PMDF and VSWEEP Virus Scanner," Message 1 thread from Eileen Byrne Telecom 617-386-2181, dated Nov. 13, 1995, 2 pages. (Reference on CD-ROM).

Google Groups, "Virus Scanning", Message 1 Thread from John F. Reddington dated Jul. 25, 1995, 5 pages. (Reference on CD-ROM).

Google Groups, "Virus Scanning", Sara.Appleyard, Sep. 8, 1996, 5 pages. (Reference on CD-ROM).

"Integralis Announces MIMEsweeper Compatible with Check Point FireWall-1 on Single NT Server," Checkpoint Software Technologies LTD., Sep. 16, 1996, 2 pages. (Reference on CD-ROM).

Kent, Stephen T., "Internet Privacy Enhanced Email," Communications of the ACM, vol. 36, No. 8, Aug. 1993, pp. 48-60. (Reference on CD-ROM).

Lemos, Robert, "Paying Up for a Spam Seal of Approval," Jun. 24, 2002, http://news.com.com/2100-1001-938976.html, printed Feb. 19, 2003, pp. 1-3. (Reference on CD-ROM).

Mason, Justin, "SpamAssasin Prehistory: filter.plx," [Online], [retrieved on Jun. 20, 2005]. Retrieved from the internet:http://spamassasin.apache.org/prehistory/. (Reference on CD-ROM).

McCullagh, Declan, "Spam Blocker charges for e-mail," CNET Newsc.com, Feb. 19, 2003, Retrieved from <http://www.dotcomeon.com/payformail.htm>, printed Jun. 30, 2005, 2 pages. (Reference on CD-ROM).

MIMEsweeper 2.0 Press Release, "Integralis releases MIMEsweeper Version 2.0 with SMTP mail security support," [online], Jan. 15, 1996, [retrieved on Jun. 8, 2004]Retrieved from the internet: http://web.archive.org/web/19961112103826/www.nha.com/rel20.htm (Reference on CD-ROM).

MIMEsweeper 2.3 Press Release, "Integralis announces version 2.3 of MIMEsweeper with new email security features," reproduced from Email World, Jun. 13, 1996, 2 pages. (Reference on CD-ROM).

"MIMEsweeper 'Online' SPD," product description for MIMEsweeper [online], [retrieved on Jun. 8, 2004], retrieved from the Internet: http://web.archive.org/web/1996112103244/www.nha.com/msw_onli.htm (Reference on CD-ROM).

"New Product 'E-Mail Virus Wall' protects companies from e-mail-borne viruses, including new macro viruses," Business Wire, p 02160157, Feb. 16, 1996, 3 pages. (Reference on CD-ROM).

Nicholas, Nick, "Realtime Blackhole List, Spamware Defined," downloaded on May 27, 2004 from <http://mail-abuse.org/rbl/spamware.htm, 2 pages. (Reference on CD-ROM).

Olawsky, Duane et al., "Developing and Using a 'Policy Neutral' Access Control Policy," Secure Computing Corporation, Dec. 2, 1996, pp. 60-67.

Omniva, "Omniva Policy Manager," Technical White Paper, Ominva Policy Systems, Jan. 2004, pp. 1-23. (Reference on CD-ROM).

Oppliger, Rolf, "Internet Security: Firewalls and Bey," Communication of the ACM, vol. 40, No. 5, May 1997, pp. 92-102. (Reference on CD-ROM).

Postini, INC., "Postini Perimeter Manager: The Industry's Leading Email Security and Management Solution," Postini Inc., 2004, 4 pages. (Reference on CD-ROM).

"Prevention of Forged-Spam email via Sendmail (Relay Disable)" <http://docsrv.sco.com/MM_admin/mmadminC.spam_forge.html>, Nov. 1999. (Reference on CD-ROM).

"Product Overview—IronMail: The Secure Email Gateway Appliance," CipherTrust, 2 pages. (Reference on CD-ROM).

Prolin, P. et al., "Network Security Probe", Telecom Bretagne, Nov. 1994, pp. 229-240. (Reference on CD-ROM).

"Raptor Systems and Trend Micro to Develop Integrated Firewall/Virus Wall; Security Partnership to Protect Against Unauthorized Access and Viruses," Business Wire, p 05030072, May 3, 1996, 2 pages. (Reference on CD-ROM).

Rhyolite Software, "Distributed Checksum Clearinghouse," [Online] [Retrieved on Jun. 20, 2005], retrieved from the internet: http://www.rhyolite.com/anti-spam/dcc, pp. 1-5, (Reference on CD-ROM).

Sullivan, Andy "Buffalo Spammer' Sentenced to 3½ to 7 years", U.S. National-Reuters downloaded on May 27, 2004 from <http://news.yahoo.com/news?tmpl=story&u=/nm/20040527/us_nm/tech_spam_dc>, 2 pages_(Reference on CD-ROM).

"Surf Control E-mail Filter," http://www.surfcontrol.com/uploadedfiles/SEF_datasheet.pdf, SurfControl plc., 4 pages. (Reference on CD-ROM).

"Symantic Ships Norton AntiVirus for Internet Email Gateways," PR Newswire, p 0224SFM068, Feb. 24, 1997, 4 pages. (Reference on CD-ROM).

"The Elm Filter System Guide," CETS Answers, Computing and Educational Technology Services, University of Pennsylvania, Jun. 24, 2003, 8 pages. (Reference on CD-ROM).

"The Elm Filter System Guide, What the Filter Program is, and How to Use It," San Diego State University ROHAN Academic Computing, May 29, 1996, pp. 1-8, available online at http://www-rohan.sdsu.edu/filter.html.

Thorud, G., "Message Handling Systems," Telektronikk, vol. 90, No. 2, 1994, pp. 86-88. (Reference on CD-ROM).

Trend Micro, "Policy-based Antivirus and Content Security for the Messaging Gateway," White Paper, Trend Micro Interscan Messaging Security Suite, Jun. 2002, pp. 1-20. (Reference on CD-ROM).

Trumbo, Jan et al., "FEATURES: Big, Bad E-mail," Network Computing, Oct. 8, 1996, 4 pages, available at <http://www.nwc.com/716/716f2.html>.

Weisband, Suzanne P. et al., "Managing User Perceptions of Email Privacy," Communications of the ACM, vol. 38, No. 12, Dec. 1995, pp. 40-47. (Reference on CD-ROM).

1997 Press Release, "Trend Micro Sues Integralis for Gateway Anti-VirusPatent Infringement, Seeks to End Sales of E-mail, Internet Gateway Product," Trend Micro, Jul. 8, 1997, 2 pages. (Reference on CD-ROM).

International Searching Authority, "Notification of transmittal of the international search report and the written opinion of the international searching authority, or the declaration," International Application No. PCT/US05/19037, dated Oct. 24, 2005, 10 pages.

Current claims, PCT/US05/19037, 12 pages.

Gülcü, Ceki et al., "Mixing E-mail with Babel," Proceedings on SNDSS, 1996, XP-002086536, pp. 2-16.

European Patent Office, Supplementary Search Report dated Oct. 2, 2006, App. No. 04702200.9, 4 pages.

* cited by examiner

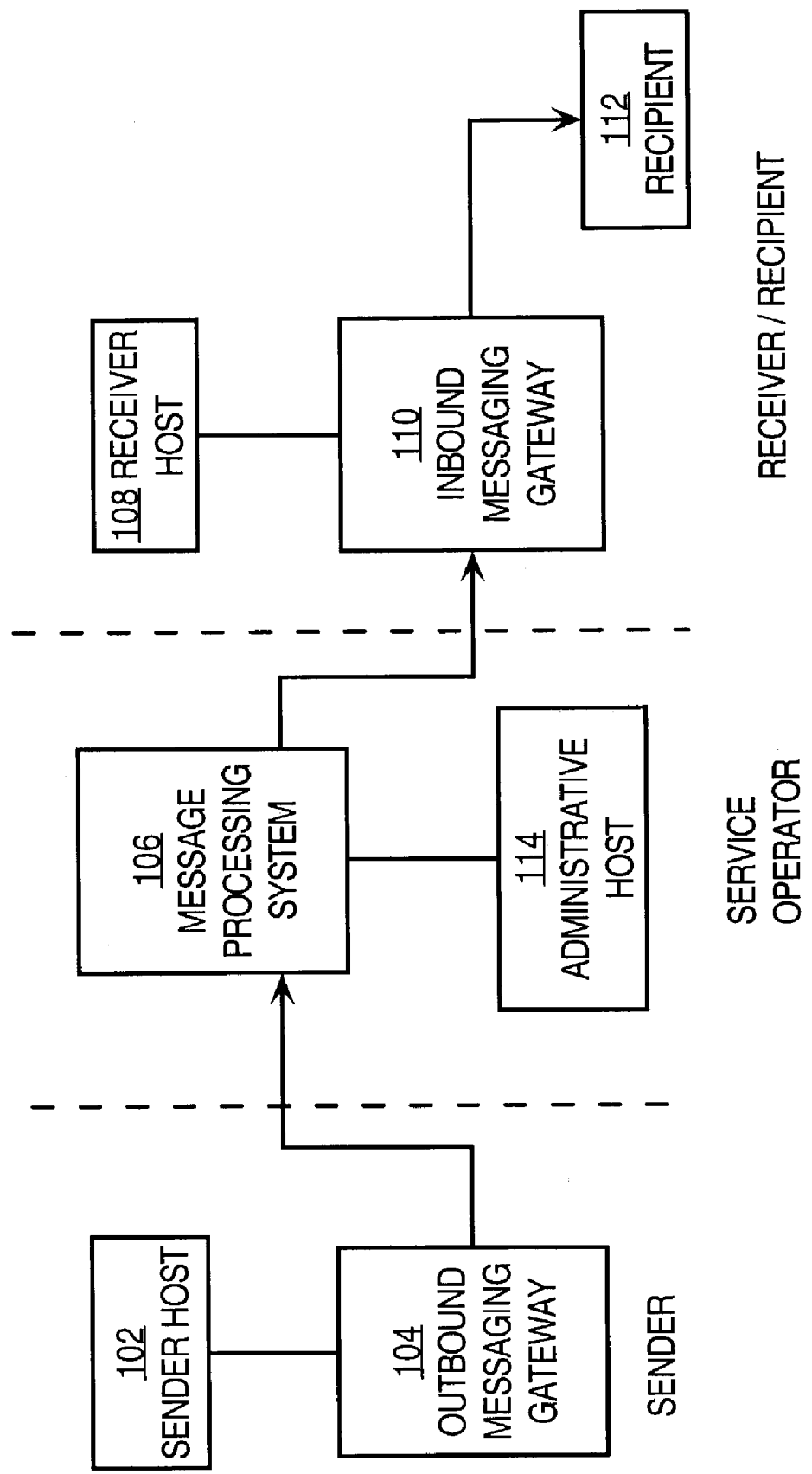

ELECTRONIC MESSAGE DELIVERY USING AN ALTERNATE SOURCE APPROACH

FIELD OF THE INVENTION

The present invention generally relates to electronic message delivery. The invention relates more specifically to electronic message delivery using an alternate source approach.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Use of electronic message communication systems has increased significantly in the recent past. In the specific context of the Internet, electronic mail ("e-mail") is now widely used for marketing campaigns and other communications with actual or prospective customers by manufacturers, merchants, service providers and other bulk senders. Using modern electronic systems, the cost of sending even millions of such messages has been negligible, and a response rate of even less than one percent has been considered worthwhile. Thus, successful delivery of messages to valid in-boxes of recipients normally translates into income for the sender.

In one approach, a sender develops a mailing list consisting of e-mail addresses of targeted individuals. The sender also creates a master message or template for an e-mail directed to the targeted individuals. The master message and the mailing list are provided to a mail gateway or other sending device, which dispatches a copy of the master message to each address on the mailing list.

Typically, the sending device is identified in the Internet by a single Internet Protocol ("IP") address, which is placed in the source IP address field of outbound IP packets representing the messages. Often messages directed to individuals in the list are first received at an inbound mail gateway associated with an Internet Service Provider ("ISP"), large business enterprise or other receiver that receives a large daily volume of messages from various sources.

However, with this approach many of the messages may fail to be delivered, because many such receivers now use filtering and blocking technology intended to prevent delivery of mass unsolicited e-mail messages ("spam"). For example, when the inbound mail gateways of certain receivers detect numerous inbound messages all having the same source IP address, the receivers may refuse to deliver the messages. The receivers also may establish filters that prevent future delivery of similar messages. This may occur even when the messages are not "spam," but rather legitimate communications to members, customers or other individuals who have done business with the sender in the past or agreed to receive its messages.

In one approach, receivers use filtering or blocking technologies that search for keywords in the message subject line and reject or quarantine messages that contain keywords matching a list of prohibited words. In another approach, receivers use "black lists" to identify and prohibit display of messages from suspect senders. Some receivers augment these technologies with personal "white lists" of friends or other acceptable senders; only messages from senders in the "white list" are admitted. The "white lists" and "black lists" also may come from networked sources. Techniques for performing "black list" lookups are described at the document "ip4r.htm" that is available online at the time of this writing at director "/junkmail/support/" of the "declude-.com" domain of the World Wide Web.

For legitimate senders, one problem is that legitimate messages do not reach intended receivers because they are blocked by such filtering or blocking technologies. Meanwhile, receivers who use filtering or blocking technologies regularly fail to receive legitimate messages because the filtering and blocking technologies cannot properly distinguish legitimate messages from unwanted messages. Certain industry-standard technical abbreviations may be identical to prohibited keywords, confusing the "spam" filter.

Further, receivers continue to receive large volumes of unwanted messages that are not properly trapped by the "spam" filter. As a result, many receivers now refuse to disclose their address except under limited circumstances. In response, many legitimate senders, such as reputable commercial enterprises, have developed "opt-in" procedures in which the addresses of receivers, such as customers, are not used at all unless the receiver affirmatively agrees to receive messages. Even when this is done, the filtering or blocking technologies may delete or quarantine even those messages from legitimate senders that are directed to receivers who have "opted in."

Consequently, the value of e-mail as a legitimate marketing tool for communications directed to receivers who have "opted in" is decreasing. Many receivers remain essentially defenseless to the daily onslaught of "spam" arriving in their e-mail in-boxes. While many states have enacted legislation that imposes civil or criminal penalties for sending "spam," these remedies are time-consuming for receivers to pursue. In addition, while many Internet Service Providers ("ISPs") actively identify and refuse to communicate or do business with those who send "spam," policing such improper activity imposes a significant cost on the ISP.

ISPs also incur costs associated with processing messages directed to recipients who do not hold an account with the ISP. For these recipients, the ISP's mail system typically generates an automatic "bounce" message that states that the recipient is unknown. Indeed, a "double bounce" may occur when a message bears an invalid sender address, and is sent to an invalid recipient. Costs are associated with maintaining the equipment and software that generates the bounce messages, and for dispatching the bounce messages back into the network to the sender. Thus, there is a need for a system or method that can reduce the number of "bounce" and "double bounce" events experienced by ISPs and derived from unwanted messages.

Thus, the problem of "spam" in the Internet e-mail context is essentially a war of attrition. There are legitimate marketing organizations that send promotional messages by bulk e-mail, and other senders who send valid bulk messages. In general, however, no one benefits from the activities of "spammers," other than the "spammers" themselves. ISPs, business enterprises, and end users all suffer inconvenience, costs, and annoyances.

Further, high-value e-mail messages regularly may be blocked or placed into a "Bulk" mail folder, based on rules that appear, to the end user, as complex, random, changing and secret. This costs e-mail marketers, and causes senders to lose confidence in the benefits of e-mail marketing. Moreover, end users are required to invest time in monitoring, checking, delivering, and negotiating "white lists" and similar mechanisms. Even when ISPs and enterprises use anti-"spam" technologies, large numbers of "spam" messages still arrive in the in-boxes of end users, or erroneously are placed in bulk mail folders.

While the foregoing example problems exist in the context of e-mail, telephone and facsimile communications suffer from analogous problems.

Based on the foregoing, there is a need in this field for a way to permit senders to dispatch messages in a manner that prevents unwarranted blocking by receivers. There is a specific need for an improved e-mail gateway that can send bulk e-mail over the Internet to targeted recipients, without blocking or filtering by spam blocking technology employed by receivers such as ISPs and large enterprises.

One possible alternative approach would be to assign a different mail gateway to each sender. However, this approach is not cost-effective because it requires too much expensive hardware. Further, this approach is an incomplete solution, because bulk senders who initiate multiple different marketing or messaging "campaigns" to different lists of users may find that after receivers receive one campaign, the receivers block all subsequent campaigns. Thus, there is a need for a way to enable multiple different senders each to manage multiple campaigns from a single mail gateway.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates an overview of a system for delivering electronic messages;

DETAILED DESCRIPTION OF THE PREFERRED EMBODIMENT

Figure 1B:
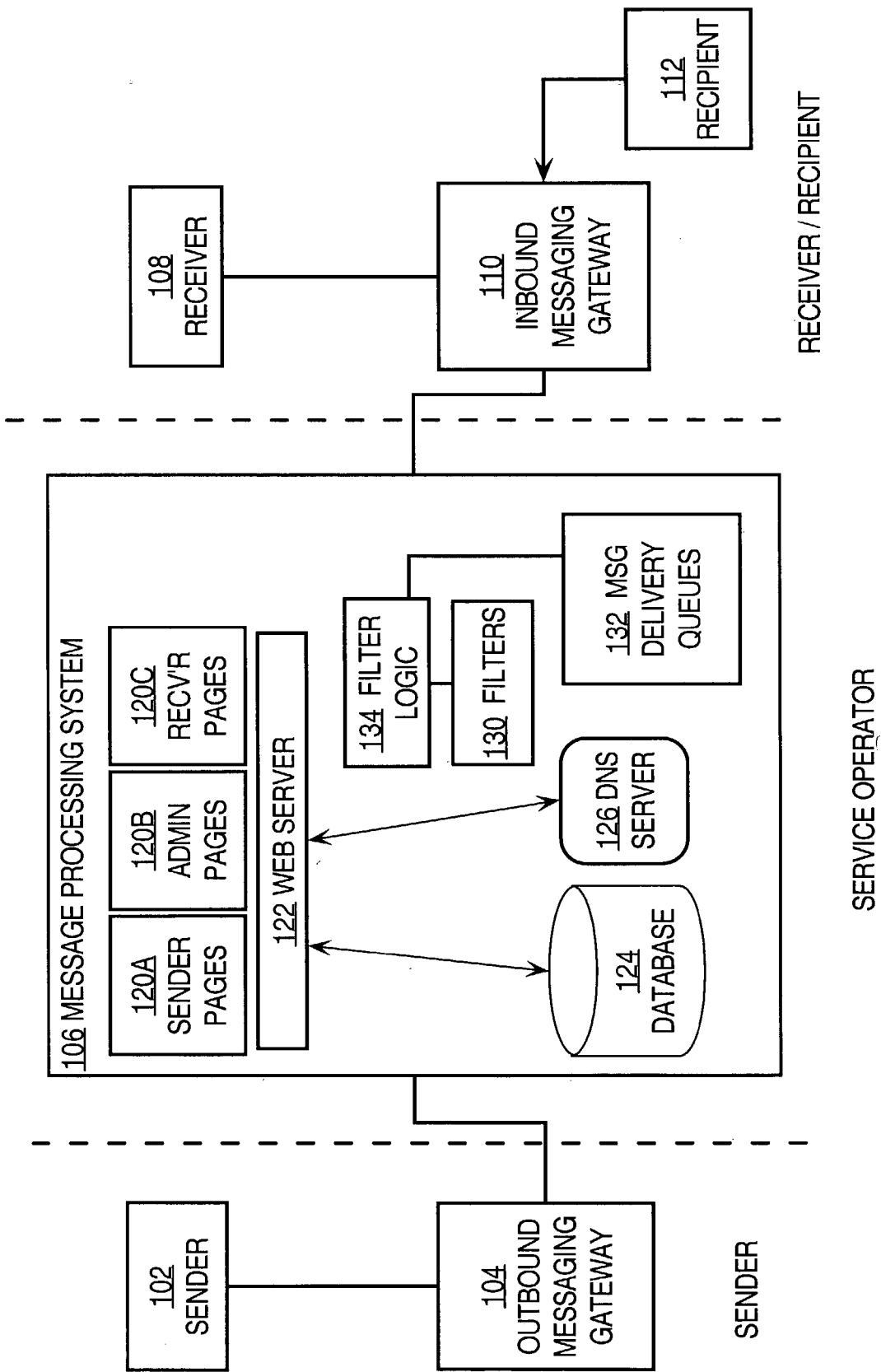
FIG. 1B is a block diagram that illustrates additional elements of the system of FIG. 1B.

Electronic message delivery approaches are described in this application. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Electronic Message Delivery Approaches
  2.1 Terminology
  2.2 System Structural and Functional Overview
  2.3 Overview of Message Processing Functions
  2.4 Message Filtering with Injection Filters
  3.0 Detailed Description of Message Filters
    3.1 Processing Rule Description
    3.2 Matching
    3.3 Header Parsing
    3.4 Filter Structure
    3.5 Filter Syntax and Memory Representation
  4.0 User Interfaces
  5.0 Implementation Mechanisms-Hardware Overview
  6.0 Extensions and Alternatives 1.0 General Overview The needs identified in the foregoing Background, and other needs and objects that will become apparent for the following description, are achieved in the present invention, which comprises, in one aspect, a method for delivering an electronic message. A message processing system is configured such that its network interfaces are assigned many different network addresses. Software elements can receive messages and send the messages out over any of the available network addresses. Software elements can analyze the received messages, apply a heuristic to select one of the available network addresses and send the messages on the selected network address. In other aspects, the invention encompasses a computer apparatus and a computer readable medium configured for delivering an electronic message.

Generally, methods and systems described herein provide techniques by which message senders can associate a specified bulk e-mail campaign with a virtual network address. A single mail gateway having a single native network address can send bulk e-mail that uses multiple virtual network addresses over a single output interface. Senders or the gateway operator can select a virtual address for a particular campaign based on traffic or other considerations.

In one alternative implementation, a filtering language is used to specify an outbound port that is used for a particular campaign based upon an attribute of a message in the campaign. One or more scripts are written in the filtering language in advance of sending messages. The scripts are parsed and an object model of the script semantics is constructed in memory of the gateway. Filters represented in the object model are applied to each outbound campaign, resulting in selecting a particular port at the time that messages are sent. Messages of the campaign are then sent on the selected port. Packets of the messages are modified to place a selected virtual address in the source address field of the packets.

The gateway can respond dynamically upon receiving information indicating that a receiver has blocked a campaign or virtual address. Such information could include an error code received from the receiver's mail gateway, information indicating a refused connection, an increase in the outbound mail queue, etc. In response, the mail gateway selects a new virtual network address and re-sends the messages, or takes other actions.

Mappings expressed in filters and rules associate a first data element with an outbound interface name. In various embodiments, the first data element is an e-mail address, domain name, user name, or client network address (such as a client IP address). In one specific embodiment, up to 254 Class C IP addressed can be mapped to different campaigns. Thus, a single mail gateway can provide the appearance that 254 different mail gateways are in operation. In one specific embodiment, an administrator uses an "Alternate Source Host" command to instruct a message processing system to map a key attribute of an inbound message to a preferred interface. Any number of such mappings may be established in the message processing system. When the message processing system receives inbound messages from a sender, the message processing system determines whether the messages have any of the key attributes identified in the mappings. If so, the messages are dispatched to recipients on the associated preferred interfaces.

The filters are changeable during execution of the system. Extensibility is supported. IP addresses can serve as a proxy for message priority mechanisms. By establishing filter rules that modify the source IP or hostname of a message based on the destination or other characteristics of the message, message routing past security protocols can be achieved. A wizard interface or command-line interface for defining filters may be provided.

Thus, message delivery approaches are disclosed in which senders can define filters with associated actions for evaluation in relation to specified messages. After creating and storing filters with specified actions, senders dispatch messages to a processing system, which evaluates the filters against the messages. If a match occurs, the processing system performs the specified actions on the messages. In one embodiment, the processing system can send the same message multiple times to different receiving systems, and can modify the source IP address and outbound interface of the message for each receiving system. Further, the source IP address or interface may be modified by a filter in response to external events, such as a receiving system blocking another copy of the message. In this way, a single message processing system can appear as a large number of virtual message sending units, thereby increasing the chance that a particular message will arrive at its destination without blocking by message blocking or filtering technologies at the receiver. For bulk mailers, different filters can be associated with different communication campaigns.

2.0 Electronic Message Delivery Approaches 2.1 Terminology

In this description, the following terms have the following example meanings:

"Enterprise" means a business entity that is not primarily in the business of sending bulk messages; its employees are often Recipients.

"Receiver" means a business entity, hardware device, software element, or combination of the foregoing that receives messages and distributes the messages to Recipients. Examples of Receivers include business enterprises, Internet Service Providers (ISPs), Web-based e-mail services, online community sites, etc.

"Recipient" means an individual account, computer, or end user that reads, uses or otherwise consumes a message sent by a Sender. Recipients often are end users who hold accounts with Receivers.

"Sender" means an individual or business entity that regularly sends large numbers of messages to actual or prospective customers, subscribers, members, or other Recipients. Examples of Senders include retail businesses include online businesses and brick-and-mortar businesses, advertising service firms, etc. A Sender also comprises an individual who registers and manages Bonded Sender network addresses for a separate end user or system that sends messages or causes messages to be sent.

"Service Operator" means a trusted third party that acts as a provider of the functions and services defined herein.

2.2 System Structural and Functional Overview

FIG. 1A is a block diagram that illustrates an overview of a system for delivering electronic messages. A Sender Host 102, which is associated with an enterprise that owns, operates or is associated with an outbound messaging gateway 104, is communicatively coupled directly or indirectly through one or more networks to a Message Processing System 106 that is owned or operated by a Service Operator. An Administrative Host 114 at the Service Operator can be used to configure and manage the Message Processing System 106. The Service Operator receives, processes, and forwards messages for one or more senders. For purposes of illustrating a simple example, in FIG. 1A one sender is shown; however, in a practical embodiment there may be thousands of distributed senders all communicatively coupled to the Message Processing System 106, which can process and forward millions of messages per day.

A Receiver Host 108 is communicatively coupled to the Message Processing System 106. The Receiver Host 108 is associated with a Receiver that owns, operates, or is associated with an inbound messaging gateway 110. A Recipient 112 is communicatively coupled to gateway 110. The Receiver represents any of a plurality of enterprises that may receive messages from the Sender that are intended for ultimately delivery to and reading by Recipient 112.

Each Gateway 104, 110 may comprise a general-purpose messaging gateway, also known as a Message Transfer Agent (MTA), mail relay, email relay, email router, Simple Mail Transfer Protocol (SMTP) server, QMQP server, or email gateway, which is specially programmed to perform the functions described herein.

For purposes of illustrating a simple example, FIG. 1A shows one of each element identified above. However, in a practical embodiment, there may be any number of Senders, Receivers, gateways, and Recipients, and the use of thousands or millions of such elements is contemplated. In a high-capacity network environment, Message Processing System 106 may be replicated in one or more instances or sites for scalability or load-balancing purposes. Further, for example purposes, certain embodiments are described herein in the context of processing e-mail messages; however, in other embodiments the messages comprise telephone calls, or pager messages.

In the arrangement of FIG. 1A, in general, in one embodiment, the Sender registers with the Service Operator and obtains an account. A representative of the Service Operator uses Administrative Host 114 to configure one or more message filters on Message Processing System 106. At any time thereafter, Sender 102 causes its Outbound Messaging Gateway 104 to send one or more messages, which are directed to Recipient 112. The Message Processing System 106 applies the message filters to the messages and performs specified actions on the messages. For example, actions may include aborting or not forwarding a message, redirecting a message, re-addressing a message, writing a log entry, etc.

The messages are received at the inbound messaging gateway 110 of the Receiver. A message can be delivered to the Recipient 112, or discarded, or marked as Bulk, or other actions are taken.

The foregoing is a general statement of operation of one example embodiment that is provided for purposes of orienting the reader to FIG. 1A. However, many variations and additional example functions are described further herein.

FIG. 1B is a block diagram that illustrates additional elements of the system of FIG. 1A. Message Processing System 106 may be implemented as one or more server-class computer systems that host a Web server 122, database 124, DNS server 126, filters 130, and filter logic 134. Web server 122 may comprise a combination of an HTTP server, such as the Apache HTTP server, and an application server such as the WebLogic application server. Database 124 provides a repository for storing information about Senders, Receivers, Recipients, and other metadata, and may comprise a relational database server such as Oracle 8i, Microsoft SQL Server, etc. Database 124 also may contain log information such as a history of network addresses that have been added or deleted by Senders.

DNS server 126 is accessible using Internet Domain Name Service ("DNS") protocol requests and can perform resolution of domain names to Internet Protocol ("IP") addresses, provide information about specified IP addresses, etc. For purposes of illustrating a clear example, DNS and IP are described herein for certain embodiments; however, embodiments are not limited to the use of DNS and IP for address processing, and the invention is applicable to any network addressing mechanisms or protocols that may be developed in the future.

For a practical embodiment, DNS server 126 has high capacity. For example, an appropriate DNS server 126 can process one million queries per day (11.6 queries per second) at a peak rate of 50 per second. Further, a DNS server that has nearly 100% availability and does not impose unreasonable message latency should be provided.

Certain functions described herein may be implemented in one or more Java Server Pages (JSPs), Active Server Pages (ASPs), or other software elements. For purposes of illustrating an example, FIG. 1B shows a JSP implementation in which functions are organized as Sender Pages 120A, Administrative ("Admin") Pages 120B, and Receiver ("Recv'r") Pages 120C. In this implementation, Sender Host 102, Receiver Host 108 and Administrative Host 114 may access functions of system 106 using a conventional Web browser application, such as Microsoft Internet Explorer, Netscape Communicator, etc. Similarly, gateway 110 may access functions of system 106 by directing HTTP requests to the system.

In particular, Sender 102 interacts with Sender Pages 120A to register with the system, read and configure one or more Filters 130. Administrative Host 114 interacts with Admin Pages 120B to perform administrative functions such as user registration and validation, providing Sender information to representatives of Senders, user maintenance, address maintenance, system maintenance, filter maintenance, invoicing, account reviews, dispute resolution, report generation, etc.

Filters 130 comprise rules and metadata for processing messages received from Sender Host 102 or Outbound Messaging Gateway 104 before the messages are forwarded to Receiver Host 108, Inbound Messaging Gateway 110, or Recipient 112. The Filters 130 may be configured or expressed in a symbolic filter definition language, and are parsed and executed by Filter Logic 134. Details of the operation of Filters 130 and Filter Logic 134 are discussed below.

2.3 Overview of Processing Functions

Message Processing System 106 also may comprise one or more other software elements, hardware elements, or manual operations that perform the functions described herein. In this arrangement, system 106 can perform numerous message-processing functions, examples of which are now summarized. In the following description, references to "user" refer broadly to Sender Host 102, Administrative Host 114, and other users of system 106.

In one embodiment, the system delivers messages using any configured IP interface as the source IP address. The source IP is defined as the IP address recognized by the recipient as the SMTP connection origin. The user may specify messages to be delivered using non-default source IP addresses through the use of Injection Filters and/or Special Headers, which are described further below. The system has a default IP interface that is used as the source IP for all messages not specified by an Injection Filter and/or Special Header.

Further, in an embodiment, delivery from multiple hostnames is supported; the system writes unique source hostnames to the message headers as indicated by the user. The user may specify messages to be delivered using non-global hostnames through the use of Injection Filters and/or Special Headers. The system has a global hostname that is written to all message headers not specified by an Injection Filter and/or Special Header. All Special Headers are stripped from recipients before being delivered.

In one approach, message processing system 106 supports an "Alternate Source Host" command. An administrator issues one or more Alternate Source Host commands to the message processing system 106 using Administrative Host 114. Each Alternate Source Host command specifies a key attribute of a message and an interface name. Key attributes may include values in the Envelope From of the message, the address of the sender, etc. In response to receiving an Alternate Source Host command, message processing system 106 creates and stores a mapping that associates the key attribute to a preferred interface. Any number of such mappings may be established in the message processing system.

Thereafter, when the message processing system receives inbound messages from a sender, the message processing system 106 determines whether the messages have any of the key attributes identified in the mappings. The determination may be performed by Filter Logic 134 or by an application program executed in system 106. If the messages have matching key attributes, the messages are dispatched to recipients on the associated preferred interfaces specified in the mappings.

In this manner, an administrator can configure the message processing system 106 with any number of mappings of message attributes to interfaces. Messages are dispatched on different outbound interfaces according to their content, headers, or subject matter. Thus the message processing system 106 appears, to external recipients, to be a large number of independent message gateways.

2.4 Message Filtering with Injection Filters

Injection filters ("IFs") may be used to filter incoming messages based on certain criteria. Injection filter actions apply to all recipients on the message. The user prioritizes injection filters such that the first criteria to match results in assigning the message to an action. Thus, it is the user's responsibility to place the most specific Injection Filters at a higher priority. Messages that do not match an injection filter are treated as default. Injection filters configured as "inactive" are passed over in the filtering process. In one embodiment, any number of injection filters can be defined.

The structure of IFs is described in detail below. In general, each IF comprises a plurality of Attributes and Filtering Criteria. In one embodiment, each IF comprises a Colloquial Name attribute that enables a user to refer to the IF later; the name can be a string of alphanumeric characters. Further, each IF has a Prioritization attribute in the form of an integer value, e.g., between 1 and 100. No two Injection Filters have the same priority.

In one embodiment, available Filtering Criteria include Receiving IP Interface, Receiving Injector, Injection Source IP, "MAIL FROM" value, "RCPT TO" value, Header Subject field value, and message size. In filtering based on the receiving IP interface, the choice of IP interface is the currently configured IP interfaces by colloquial name. Multiple IP interfaces may be specified, and "Any IP interface" is the default. In filtering based on Receiving Injector, the filter specifies one of the currently configured Injectors by colloquial name. Boolean expressions may be used to construct filters that specify multiple injectors. In filtering by Injection Source IP, the Injection Source IP address is the IP address of the host connecting to the system to inject the message. The Injection Source IP address can be indicated using the "Allowed Hosts" syntax that is used for IP addresses.

In MAIL FROM filtering, an IF filters messages based on specific strings in the <MAIL FROM> command in the message envelope. Full C-style regular expressions are accepted in this and all other filters. In RCPT TO filtering, an IF filters messages based on specific strings in the <RCPT TO> command in the message envelope.

In Header Subject Field filtering, an IF filters messages based on specific strings in the subject field in the message header. Header parsing may be turned off, in which case Subject Field filtering does not take place. In Message Size filtering, an IF compares the message size to a user-defined value to determine a match. The user may define an operation (e.g., less than, greater than, etc.) is used to perform the comparison.

Each filter may be active or inactive, as indicated by an attribute value. When an injection filter is set to inactive, the filter maintains its priority, but the filter is skipped by Filter Logic 134 when evaluating the Filters 130 in the filtering order. Inactive filters may be reset to active state.

Each Filter 130 has one or more associated actions. In one embodiment, actions comprise Reject, Schedule, Priority, Deliver as Mail, Deliver to Alternate Email Address, Deliver to Alternate Domain, Deliver to Alternate IP, Write to Logs, Abort Message, Bounce Message, etc. Other actions may be defined.

In certain variations of the implementation described herein, a Reject option or Schedule function can be provided. When evaluation of a filter indicates a Reject message, the message is rejected during the SMTP or QMQP conversation. The injection filter allows the user to enter a specific argument that is communicated to the injecting host when the message is rejected. When a Schedule action occurs, the injection filter can set any, all, or none of the Deliver After scheduling protocol for all message recipients, the Bounce After scheduling protocol for all message recipients, or the Delete After scheduling protocol for all message recipients.

In another variation, a Priority action can be provided. In a Priority action, delivery configurations set the delivery priority on all message recipients. The Deliver as Mail action provides the standard mechanism of mail delivery, which is to deliver recipients as mail. Standard SMTP delivery occurs over the default delivery IP interface. In a Deliver to Alternate Email Address action, an IF can change the email address for message recipients to be delivered. The alternate delivery address replaces the existing delivery address in the RCPT TO line of the message envelope.

Without special IF configuration, message processing system 106 determines a destination mail host by analyzing addresses of message recipients. In the Deliver to Alternate Mailhost action, an IF uses the parameter value of the action to determine the IP address of the host to which the mail is delivered. No change is made to the recipient address in the message envelope.

In the Write to Logs action, the IF causes Filter Logic 134 to write the entire message (including the recipient list) to mail logs. In the Abort Message action, the IF causes Filter Logic 134 to abort all message recipients. This action is recorded as an aborted message for mail monitoring purposes. In the Bounce Message action, an IF can bounce messages according to global bounce configuration settings. The action is recorded as an aborted message for mail monitoring purposes.

In one practical application, these approaches are useful to senders that need to engage in multiple mass communication campaigns but also wish to increase the chance that a particular message will arrive at its destination without blocking by message blocking or filtering technologies at the receiver. For such bulk mailers, different filters can be associated with different communication campaigns. For example, a sender could establish an internal mapping of campaigns to filters as set forth in Table 1:

TABLE 1

EXAMPLE MAPPING OF CAMPAIGNS TO FILTERS

| Campaign | Virtual Hostname or IP Address | Filter |
| --- | --- | --- |
| Summer Sale | summersale.merchant.com | rule1 : if (subject == 'Summer Sale') { alt-src-host ('merchant_interface'); deliver( ); } |
| Rebate Offer | 127.24.1.1 | rule2 : if (subject == 'Rebate Offer') { alt-src-host ('other_interface'); deliver( ); } |

Using this approach, the message processing system will automatically send messages received from a sender host out on different interfaces or with different source address labeling depending on the communication campaign represented by the message. In one embodiment, the processing system can send the same message multiple times to different receiving systems, and can modify the source IP address and outbound interface of the message for each receiving system. Further, the source IP address or interface may be modified by a filter in response to external events, such as a receiving system blocking another copy of the message. In this way, a single message processing system can appear as a large number of virtual message-sending units for one sender or a large number of senders.

3.0 Detailed Description of Message Filters

Electronic messages that are forwarded through system 106 can have actions performed on them based on factors such as message characteristics, injection sources, and message destination. The parameters to be matched and the resulting actions can be specified in Filters 130, which specify a table of rules and are prepared by a sender or other mail administrator. The actions that can result from the application of the rule set include aborting, redirecting, re-addressing, and logging. A rule definition language allows an administrator to associate matching criteria with actions and is also amenable to manipulation from both command line and graphical user interfaces as well as using a simple text editor.

Figure 2:
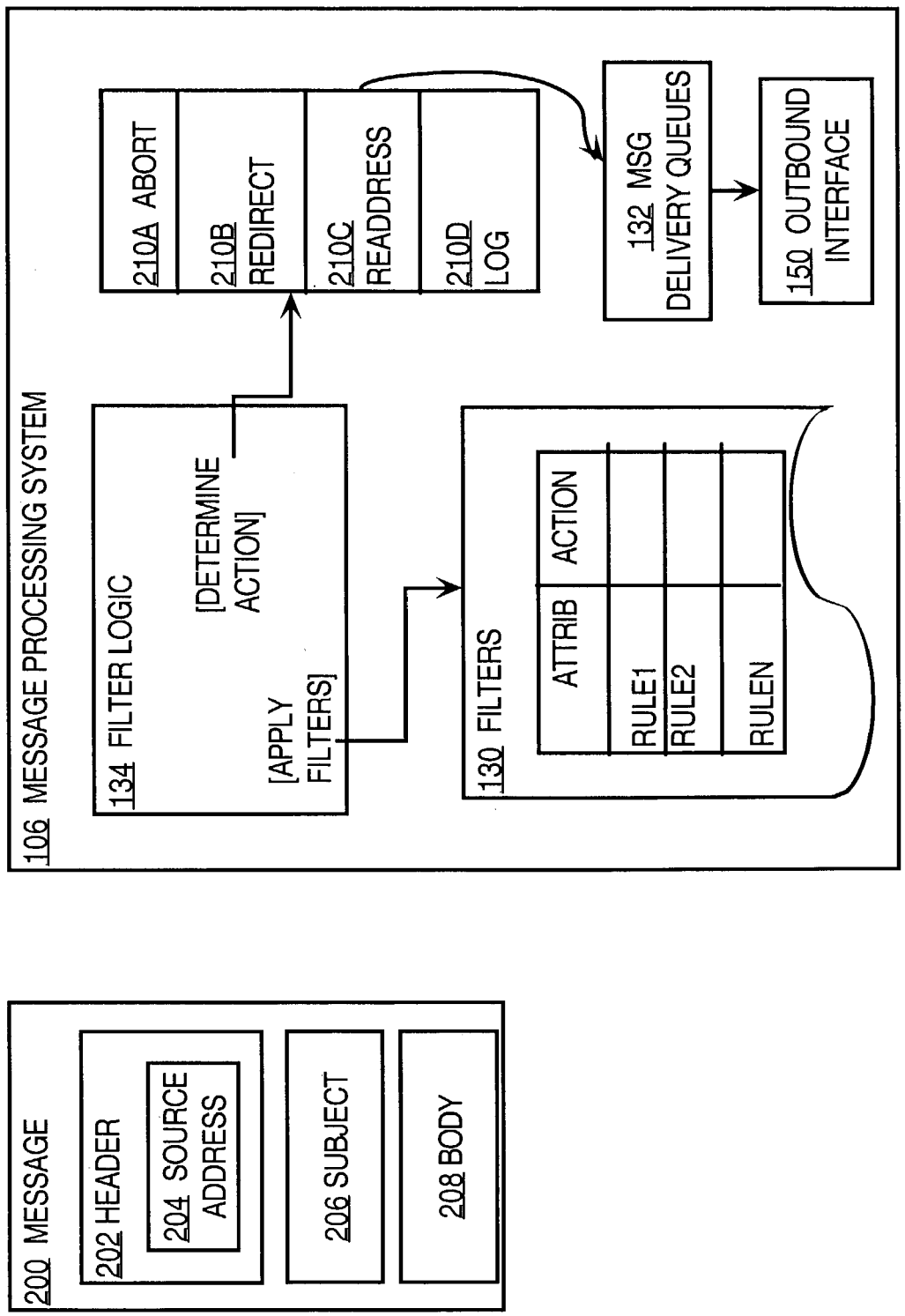
FIG. 2 is a data flow diagram of a process of electronic message delivery, according to one embodiment.

The Filters 130 of FIG. 1B, FIG. 2 may comprise the rules. Filter matching and execution of actions are performed by Filter Logic 134. The Filter Logic 134 may be implemented using one or more classes, methods, or other software elements that are created using a convention object-oriented program development environment and executed by system 106. APPENDIX 1 presents an example class definition for one implementation of Filter Logic 134.

FIG. 2 is a data flow diagram of a process of electronic message delivery, according to one embodiment. A message 200 is presented to message processing system 106. In general, message 200 comprises a header 202 that includes a source address 204, a subject 206, and a body 208. Message 200 is received at filter logic 134, which applies filters 130 to the message. Each of the filters 130 comprises parameters and actions. The parameters are matched to attributes of the message 200. If a match occurs, then filter logic 134 performs the action specified in the filter. Actions 210 may include an abort action 210a, redirect action 210b, re-address action 210c, log action 210d, etc.

Executing certain actions causes system 106 to place the message 200 in one of a plurality of delivery queues 132. When a message 200 is placed in a delivery queue 132, a delivery process of system 106 sends the message on an outbound interface 150. In certain embodiments, a single outbound interface is provided; in other embodiments, a plurality of outbound interfaces are provided and one is selected by filter logic 134. As a result of the data flow illustrated in FIG. 2, a message may be sent in a particular manner after evaluation of appropriate filters. For example, successive messages can be sent with different source IP addresses in the headers of the messages depending on the destinations of the messages.

Operational details of system 106 that are used to implement the general process of FIG. 2 are described herein based on three main components comprising processing rule description, matching, and actions.

3.1 Processing Rule Description

Rules are described in a filter definition language. Filtering rules are parsed and converted into an internal format that is then used to drive the matching engine as messages are injected into the system. Depending on the action that has been specified for a particular rule by the rule creator, a number of different actions can then be taken per message or per recipient.

3.2 Matching

Figure 3A:
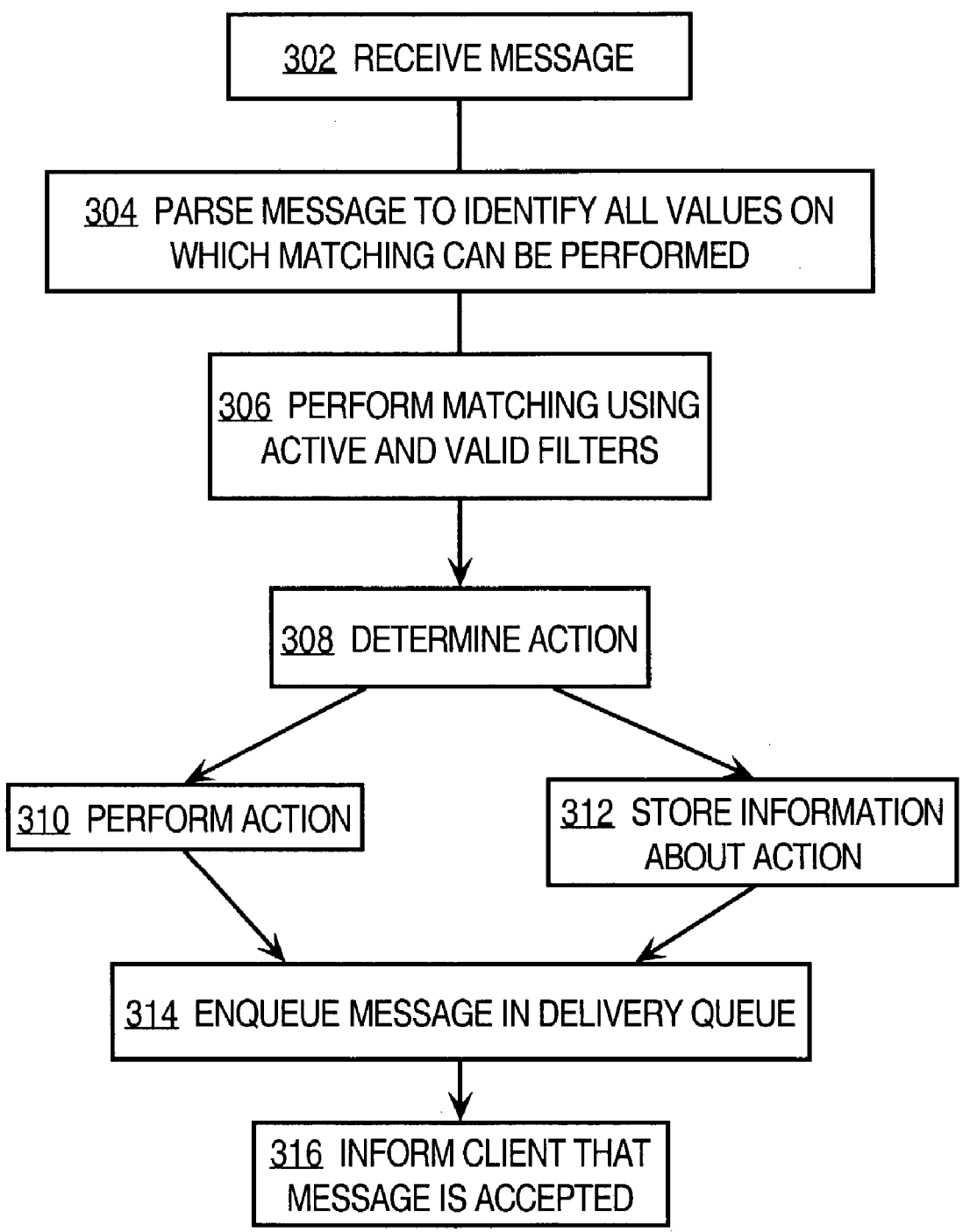
FIG. 3A is a flow diagram of a method of performing actions on messages.

A technique for matching filters to messages is now described in the larger context of complete message processing by system 106, with reference to FIG. 3A. FIG. 3A is a flow diagram of a method of performing actions on messages. For purposes of illustrating a clear example, the process of FIG. 3A is described herein with reference to the system of FIG. 1A, FIG. 1B, and FIG. 2.

In block 302, a message is received. For example, system 106 receives message 200 from Sender Host 102. In block 304, the message is parsed to identify all values on which matching can be performed. In block 306, matching is performed using all filters that are then currently active and valid.

In block 308, an action for a filter is determined, assuming that matching in block 306 results in a match. When the required action is determined, the action may be performed as shown in block 310, or information about the action can be stored for later use, as shown in block 312.

Certain actions result in enqueuing the message in a delivery queue, as shown by block 314. If enqueuing is successful, then in block 316, the client that provided the message is informed that the message has been accepted for delivery.

Referring again to block 304–306, upon injection of a message 200 into system 106, the message is parsed and all values on which matching can be performed are identified. Most of the values can be derived at little processing cost, because they can be determined from either the incoming connection based on an associated socket or injector, or from the message envelope. Information that is more costly in terms of processing to obtain is only extracted if a matching rule demands it.

For the current set of fields to be matched, all matches are made prior to enqueuing the message 200 in one of the delivery queues 132 at block 314. The actions can be taken immediately, or the message can be earmarked for further modification or special handling at a later point in the processing. Only at this point in the injection process is all the information required for evaluating the filters available, and it is only at this point that certain message handling actions can be taken. This all occurs before the system 106 confirms to Sender Host 102, or another client, that the message has been accepted. If a failure occurs during processing, then the client does not receive a satisfactory response to the injection, and therefore the client can assume that the message was not successfully enqueued for delivery.

The matching process involves applying a series of filters to the incoming message. When the filter's rules evaluate to true for the given message, the filter's actions are applied to the message, as indicated by block 308–310. Only filters that are "active" and "valid" are applied to a message. If either the Active attribute or Valid attribute of a message is false, the filter is not be applied to the message, meaning that the filter's rules are not evaluated and the filter's actions are not applied. By default, filters entered by the user are set as "active." A user may set a filter's state as active or inactive through the CLI or GUI.

In one embodiment, the state of a filter as valid or invalid is visible to the user, but the user cannot change the state. A filter is considered invalid if one or more of its rules or actions cannot be evaluated or performed for any reason. An example would be a rule that requires header parsing, but header parsing has been turned off. Another example would be a filter that is dependent on a particular interface that has been deleted.

3.3 Header Parsing

Figure 3B:
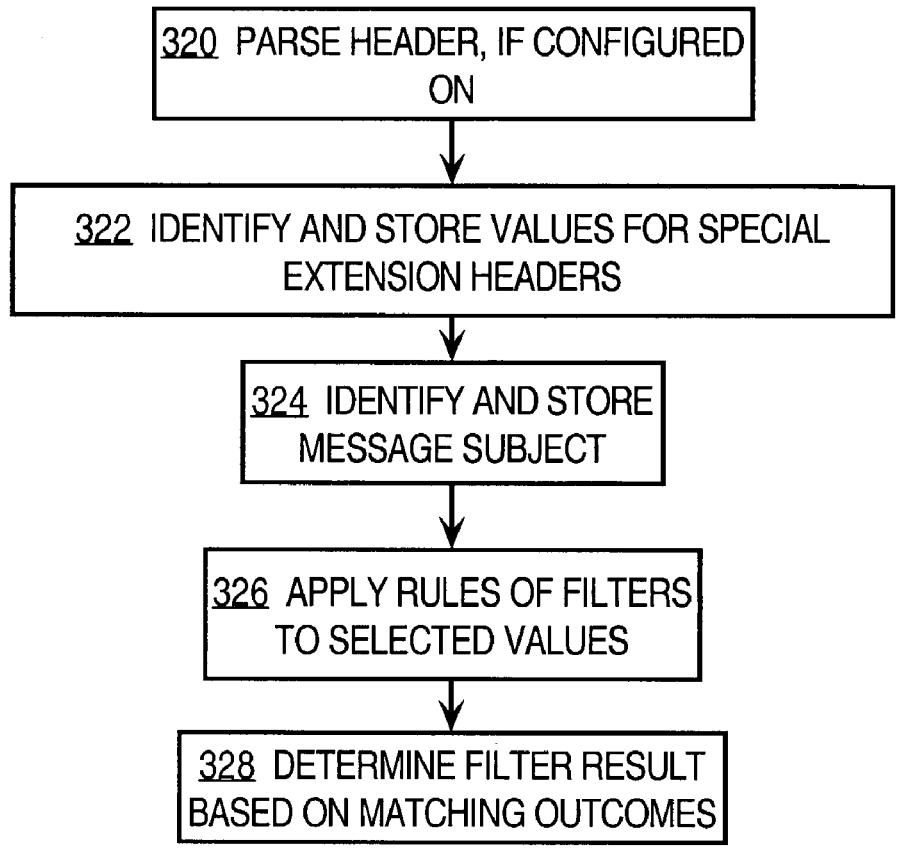
FIG. 3B is a flow diagram of a method of parsing filter rules.

FIG. 3B is a flow diagram of a method of parsing filter rules that may be used in one implementation of block 304 of FIG. 3A.

In block 320, the header is parsed if such parsing is configured as on. Header parsing (including parsing of Special Header fields) is globally configurable as on or off by the user. By default, header parsing is configured off.

In one embodiment, the subject field and Special Header extension fields are matched in the message header. Thus, in block 322, the special header extension fields are identified and associated values are stored; in block 324, the message subject is identified and stored. Special Headers are treated specially in that system 106 can be configured to remove them, and matching headers can be used as part of a filter rule.

A message's contents are parsed up to the end of its headers, marked by a blank line (the sequence "\r\n\r\n"). The content is not parsed beyond that point. For multi-part mail merge messages (using the LSMTP protocol), the first part received is examined for header data. If header parsing is disabled, the system does not attempt to parse the message header for any information.

If a user attempts to enter a new filter that requires header parsing, and header parsing is disabled, then filter logic 134 causes system 106 to prompt the user to turn header parsing on. When a user enables header parsing, and certain filters are marked as invalid because they contain rules that require header parsing, and which are not invalid for any other reason, such filters are set valid. When the user disables header parsing and a certain filter requires a comparison, the user must confirm the decision to disable header parsing. If confirmed, filters that contain such a rule are set invalid.

As part of block 324, the subject of the message is retrieved from the message body and stored in a manner that is easily referenced by any filters that require it. In one embodiment, the subject field of a message is marked by the sequence "\r\nSubject: ". The subject is all characters appearing after this sequence of characters, up until the sequence "\r\n". This end marker sequence is not considered part of the subject. In another embodiment, if no filter within the current set of filters has a rule that references a message's subject, then the message subject is not be parsed or stored.

Referring again to FIG. 3B, the matching step of block 306 of FIG. 3A may involve applying rules to selected values in block 326, and determining a filter result based on matching outcomes of rules, as shown by block 328. In one embodiment, several types of data may be used to match a message to a filter. Such comparisons are termed "rules." A rule evaluates to true if the message contains data that matches the rule. A filter may contain more than one rule, associated by Boolean operators AND, OR, and NOT, as described below in the section entitled "Filter Syntax." A filter is considered to match a message if the Boolean expression evaluates to true.

In one embodiment, available filtering criteria include Receiving IP Interface, Receiving Injector, Injection Source IP, "MAIL FROM" value, "RCPT TO" value, Header Subject field value, and message size, which are implemented in Filter Logic 134 as follows.

1. Receiving IP Interface. Filter Logic 134 can filter messages based on the receiving IP interface. The specified IP interface is any of the currently configured IP interfaces by colloquial name. Multiple IP interfaces may be specified, and "Any IP interface" is the default. If any of the colloquial names chosen by the user is ever deleted or renamed, a filter containing this rule is set invalid. If, through the user interface, the user attempts to delete or otherwise modify an interface referenced by this rule, a warning is presented, indicating that any changes may invalidate any filters referencing that interface.

The syntax of this comparison is "recv-int==<cname>", where cname is the colloquial name of the interface the message must be received by to match.

2. Receiving Injector. Message filters can filter messages based on the receiving Injector. The specified Injector is one of the currently configured Injectors by colloquial name. Multiple Injectors may be specified, and "Any Injector" is the default. If any of the colloquial names chosen by the user is ever deleted or renamed, a filter containing this rule is set invalid. If, through the user interface, the user attempts to delete or otherwise modify an injector referenced by this rule, a warning is presented, indicating that any changes may invalidate any filters referencing that injector.

The syntax of this comparison is "recv-inj==<cname>", where cname is the colloquial name of the injector the message must be received by to match.

3. Remote Injection IP. This value is also referred to as "Injection Source IP." Message filters can filter messages based on the Injection Source IP address. The Injection Source IP address is the IP address of the host connecting to the system to inject the message, such as an IP address of Sender Host 102. Injection Source IP address is indicated using the "Allowed Hosts" syntax that is defined for IP addresses.

The syntax of this comparison is "remote-ip==<allowed>", where allowed is a complete or partial IP address that must match the client's IP address. For example, if the client address was "1.2.3.4", it would match against an allowed of "1.2.3.4", "1.2.3", "1.2" and "1".

4. MAIL FROM. Message filters can filter messages based on specific strings in the <MAIL FROM> command in the message envelope. The match pattern is accepted as a full regular expression. By default, regular expressions do not infer line anchors for the beginning and end of a string. For example, ".*@ironport.com" matches "paul@ironport.com" and also matches "foo@ironport.com.foo". A line-anchored version of this regular expression, which only allows the former example, is ".*@ironport.com$".

The syntax of this comparison is "mail-from==<regex>", where regex is a expression match within the MAIL FROM data.

5. RCPT TO. Message filters can filter messages based on specific strings in the <RCPT TO> command in the message envelope. The match pattern is accepted as a full regular expression. By default, regular expressions do not infer line anchors for the beginning and ends of strings, as in the MAIL FROM example given above.

If any one recipient in a recipient list of a message matches on this rule, then the entire message is considered as matched. Any actions taken as a result of matching on such a rule are not limited to the particular recipient upon which the rule matched. For example, if a rule is defined to look for recipients that match "*@ironport.com", and the action to be taken is to abort the message, the entire message is aborted if just one recipient email matches "*@ironport.com".

The syntax of this comparison is "rcpt-to==<regex>", where regex is a regular expression match within the RCPT TO data.

6. Message Subject. Message filters can filter messages based on specific strings in the subject field in the message header. The subject field is defined as any characters between the sequence "\r\nSubject: " and the sequence "\r\n". If a message header does not contain a subject line, this rule cannot evaluate to true. The match pattern shall be accepted as a full regular expression. By default, regular expressions do not infer line anchors for the beginning and ends of strings, as in the MAIL FROM example given above. If header parsing is turned off, any filter containing this rule shall be marked invalid.

The syntax of this comparison is "subject==<regex>", where regex is a regular expression match within the subject.

7. Special Headers. There are specific Special Headers that can be transmitted by the injecting source. These take the form of "X-IronPort-xxxxx". The message-filtering rule can match either both the "xxxxx" name and the string, i.e., the contents of the header itself. In one embodiment, a header matching filter uses the syntax "header(<name>)==<regex>", which evaluates to True if a header matching <name> has a value that matches the <regex>. Alternatively, the syntax "header(<name>)" may be used, which evaluates to true if a header with a matching name is found, and false if no match is found. If header parsing is turned off, any filter containing this rule is marked invalid.

8. Body Size. Message filters can filter on the message size in bytes. Matching is done by a comparison of greater than, less than, or equal to. The size attribute of the filter is the size of the entire message body including the headers. For mail merge (LSMTP) messages, the message size is considered to be the total size of all parts, regardless of whether any recipient is destined to receive all of them.

The syntax of this comparison is "body-size <relop><size>", where relop is one of "<", "<=", ">", ">=", or "=", and size is an unquoted integer, which may be appended by "b", "k", "M", or "G" (for bytes, kilobytes, megabytes, and gigabytes).

3.4 Filter Structure

Figure 3C:
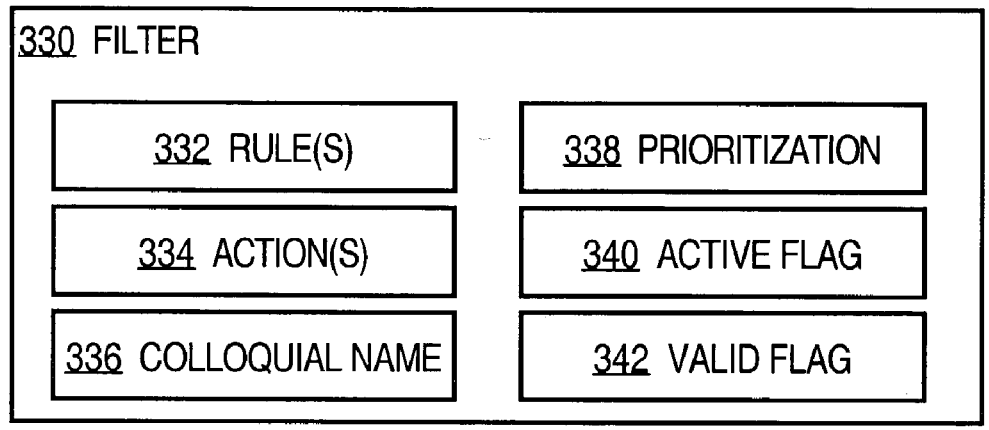
FIG. 3C is a block diagram of a filter.

FIG. 3C is a block diagram of a filter. According to one embodiment, each filter 330 is a data structure that may be stored in memory of system 106 and comprises one or more rules 332, an action 334 for each rule, a colloquial name 336, a prioritization value 338, an active value 340, and a valid value 342. A message filter consists of two major parts, a set of rules and a set of actions. If the rules of a filter evaluate to true when applied to a message, then the actions of the filter are executed on the message, possibly changing its attributes, or affecting its delivery.

Filters are applied to a message in an order specified by the prioritization value 338. The user may define an execution sequence for the message filters by setting the prioritization values. By default, filters are executed in the order that they were input to the system. After a message has passed through all the filters, if it has not been aborted, bounced, or delivered, it is delivered.

Colloquial Name value 336 of FIG. 3C comprises a name that a user or programmer can use to refer to a filter at a later time. The name is unique among all injection filter names. In one embodiment, the name is a string of alphanumeric characters of any length. IF Prioritization value 338 establishes a prioritization for the filter based on its place in a sequence of all filters. A user may reorganize this sequence, which by definition will alter the filters' priorities. For user interface purposes, the first filter in the sequence is assigned the priority "1", the second shall be assigned the priority "2", and so on.

If a user inserts a new filter, and assigns it a priority equal to an existing filter, the new filter assumes the provided priority, and all existing filters with a priority value equal to or greater than the new filter shall have their priority value incremented by one. For example, if there are four filters "a", "b", "c", and "d", with the priority values of 1, 2, 3, and 4 respectively, and a new filter "e" is inserted with a priority of 2, filter "a" is unaffected. The new filter "e" has a priority of 2. Filters "b", "c", and "d" then have their priorities changed to 3, 4, and 5 respectively.

Active flag 340 indicates whether a filter is active or inactive. A user may set a message filter inactive. An inactive filter maintains its priority, but is skipped in the filtering order. Inactive filters may be reset to active state by the user. Valid flag 342 indicates whether a filter is valid or invalid. Message filters may be set to invalid by the system. Invalid filters maintain their priority, but are not evaluated. Invalid filters are reset to valid by the system when the system determines that the filter is no longer invalid. Users can inspect a filter's valid/invalid state through the graphical user interface or CLI described herein; in one embodiment, a user cannot change a filter's valid/invalid state.

3.5 Filter Syntax and Memory Representation

According to one embodiment, filters are defined using a filter definition language having a syntax that can unambiguously specify the characteristics outlined above. Table 2 presents a description of one example grammar for the filter definition language, in Backus-Naur Form:

TABLE 2

| BNF Description of Filter Grammar | |
|---|---|
| Filterset :: | Filter Filterset |
| | Filter |
| Filter :: | Filtname Filterbody |
| | Filtbody |
| Filterset :: | Filter Filterset |
| | Filter |
| Filter :: | filtname : Filterbody |
| | Filterbody |
| Filterbody :: | "if" Expr '{' Statement-list '}' |
| | "if" Expr '{' Statement-list '}' "else" |
| | '{' Statement-list '}' |
| Statement-list :: | Statement-list Statement |
| | Statement |
| Statement :: | Action ';' |
| | Filter |
| Expr :: | Expr "or" Term |
| | Term |
| Term :: | Term "and" Factor |
| | Factor |
| Factor :: | "not" ExprCore \| ExprCore |
| ExprCore :: | Comparison |
| | '(' Expr ')' |
| | "true" |
| Comparison :: | Param Relop val |
| Param :: | "recv-int" \| "recv-inj" \| "remote-ip" \| "mail-from" \| "rcpt-to" \| "subject" \| "body-size" |
| Relop :: | "==" \| ">" \| ">=" \| "” \|"<=" \| ">" |
| Action :: | "alt-src-host" '(' qstr , qstr ')' |
| | "alt-rcpt-to" '(' qstr ')' |
| | "alt-mailhost" '(' qstr ')' |
| | "abort" '(' ')' |
| | "bounce" '(' ')' |
| | "deliver" '(' ')' |
| | "notify" '(' qstr ')' |
| | "bcc" '(' qstr ')' |
| filtname | [_A–Za–z]([_A–Za–z0–9]\|'-')* |
| qstr | quoted string |

Several terminals (e.g., qstr, val) listed in the grammar are not explicitly defined. In one embodiment, parsing filters expressed in the FDL involves deferring the validation of legal values until a semantic analysis phase. Syntactic analysis is performed by a lexical analyzer process that identifies tokens in a filter, and that understands quoting and white space. Validation of the non-terminals listed above is deferred until after an entire rule is identified.

Rule actions are executed in the order that they are listed on the rule definition line. Enforcement of one particular grammatical rule, that a final action cannot have any other rules after it, is performed through semantic analysis.

The values Ipaddr and hostname conform to well-accepted conventions with IP addresses represented as dotted decimal quads. In one embodiment, a filtname consists of alphanumeric characters plus '–' (minus) and '_' (underscore) but with minus and digits disallowed as the first character. In this embodiment, "my-rule_1", "_10", and "r101" are legal, but "–101" and "101" are illegal. Quoting is not allowed. These constraints enable the system to automatically disambiguate filter sequence numbers and filter names.

In addition, in an embodiment, the terms "all", "last", "if", "else", "true", "and", "or", "not", "relop", "alt-src-host", "alt-rcpt-to", "alt-mailhost", "abort", "bounce", "deliver", "notify", "bcc", "log", "recv-int", "recv-inj", "remote-ip", "mail-from", "rcpt-to", "subject", and "body-size" with any variation of capitalization, are reserved, and may not be used for filter names.

A value is a string consisting of anything that is not a separator, and is passed on to the appropriate context based semantic analysis for validation. Thus, when trying to construct a match based on remote-ip, the value logically would have to be an IP address or a CIDR-style IP block. A match based on subject consists of a regular expression. The legal values for each parameter to be matched are described in greater detail in parts of this document pertaining to the individual matching rules.

Table 2 below presents an example of a filter set.

TABLE 2

Filter Set Example

```
rule1 : if (rcpt-to == '"bob" smith' and mail-from == 'john\\'s place') {
        abort( );
    } else {
        notify ("paul's email");
    }
rule2 : if (subject == 'foo' or body-size > 4k) {
        bcc ("jimmy \\"the greek\\"");
        bounce( );
    }
rule3 : if recv-int == 'main' {
        if (not remote-ip == 'ironport') {
            alt-src-host ('spamco', 'fooco');
        }
        deliver( );
    }
rule4 : if ((recv-inj == 'SMTP' or recv-int == 'notmain') and
        true) { deliver( ); }
```

After parsing, filters are represented in memory as a tree structure that is rooted in a Filterset object, which contains a list of all top-level filters. A matching engine within Filter Logic 134 iterates through the list in sequence and the filters are applied until a final action is called for, or the list is exhausted. Thus, the matching engine performs a traversal of the tree until the fate of the message is decided.

The matching engine executes immediately after a message is completely received, but before the message has been assigned to a queue. Information that is needed for later stages of the processing pipeline is encoded in the message. An example of an action that is applied late in the pipeline is Deliver from Alternate Source. The message filter tags a message associated with that action and encodes the alternate source name. Later, during delivery, this information is used to change the source hostname and IP address.

3.6 Filter Actions

A message may receive special treatment when the filter-matching engine of Filter Logic 134 determines that a filter has matched and that a specified action should be applied. Almost all matching criteria cause Filter Logic 134 to process the entire message as specified in the filter rules; however, a rule that matches on recipients may cause more complicated behavior, because the action is applied only to a subset of recipients.

A single filter may trigger the execution of multiple actions. Each action is executed in the order it was entered into the filter, until a final action is executed. If a filter contains no final action, the next filter in sequence is applied to the message, until no more filters remain. Any number of message actions may be applied to a single message. This may result in resetting the same message attribute several times during processing.

Figure 4:
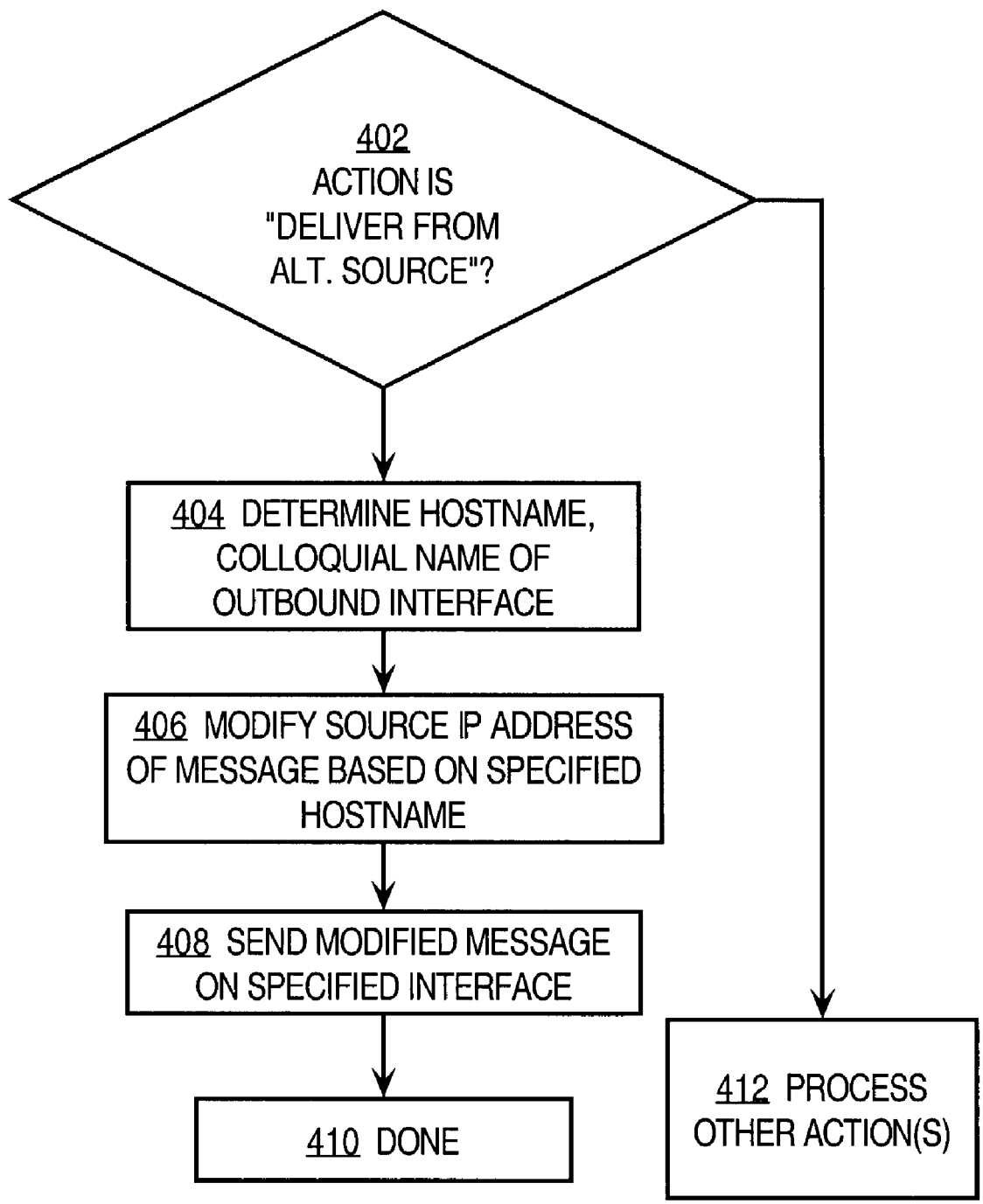
FIG. 4 is a flow diagram of a process of delivering an e-mail message from an alternate source.

Examples of available filter actions are now described. According to one embodiment, one available action is Deliver from Alternate Source. FIG. 4 is a flow diagram of a process of delivering an e-mail message from an alternate source, which may be implemented as part of determining an action at block 308 of FIG. 3A. Thus, FIG. 4 assumes that a message has been received from Sender Host 102 at Message Processing System 106, that a filter has matched on the message, and that the action specified by the filter is undergoing evaluation.

In block 402, a test is performed to determine whether the specified action is "Deliver from Alternate Source." Block 402 may involve recognizing the string "alt-src-host" as part of parsing or executing a filter. If the test of block 402 is false, then control passes to block 412 in which other actions are processed, depending on how the actions are specified in the filters. Alternatively, in block 404, the process determines a hostname of the alternate source and a colloquial name of an outbound interface from which the message is to be sent. In one embodiment, block 404 involves parsing and recognizing the colloquial name as a parameter in the "alt-src-host" command, and the hostname is obtained from an internal mapping of hostnames to interfaces. In this embodiment, during configuration of interfaces of the message processing system 106, an administrator associates a hostname with each specific interface. In an alternative approach, the hostname could be specified as part of the command; however, such an approach could enable users to inadvertently use multiple hostnames for the same interface, which would invariably cause a reverse DNS lookup to fail when performed by a receiving mail server.

In block 406, the source IP address of the message is modified based on a hostname that is associated with the specified interface. In block 408, the modified message is sent on the specified interface. Block 408 may involve queuing the message for delivery in a queue that is associated with the specified hostname; thus, there may be multiple delivery queues, each associated with a different host. In block 410, processing is complete.

Accordingly, using the process of FIG. 4, message filters can set the source IP address and hostname from which the message is delivered. Valid interface choices include all currently configured IP interfaces; such interfaces are specified by colloquial name. The choice of interface is as by reference; thus, changing an interface's name or deleting an interface invalidates the entire filter, but altering an interface's configuration in any other way does not affect operation of the filter.

The user can enter any hostname. However, most mail servers perform a reverse DNS lookup on the IP address of the client, i.e., on the IP address chosen in the filter, and may ignore the hostname or reject the message if they do not match. Ensuring that the IP address and hostname match in DNS is a responsibility of the user who specifies a filter.

By default, recipients are delivered using the default delivery interface and the default hostname. If, through the user interface, the user attempts to delete or otherwise modify an interface referenced by this action, a warning shall be presented, indicating that any changes may invalidate any filters referencing that interface. As can be inferred from Table 2, the syntax for specifying this action in a filter is "alt-src-host (<cname>)", where cname is the colloquial name of the interface to be used when transmitting the email.

In one implementation, separate queues are created for the different combinations of destination domain and alt-src-host information. For example, a first queue holds mail destined for foo.com (through the default delivery interface), and an additional queue for mail destined to foo.com/(my-alt-host-interface, my-alt-hostname) is created and used if a rule caused some messages for foo.com to go out a separate interface/hostname using the alt-src-host action.

In another embodiment, Filter Logic 134 supports a Deliver to Alternate Email Address action, by which message filters can change the email address for message recipients to be delivered. The alternate delivery address replaces the existing delivery address in the RCPT TO line of the message envelope. This change is applied to all recipients of the message. It does not affect what mail host is contacted for the delivery of the message.

As can be inferred from Table 2, the syntax of this action is "alt-rept-to (<email>)", where email is the address to which all copies of the email should be sent. An alternate syntax of "alt-rcpt-to (<email>, <int>)" is supported, in which <int> is an integer value also referred to herein as a copy count value. In the alternate syntax, if the integer is zero, only one copy of the email is sent to the supplied address. If the integer is non-zero, or if the optional parameter is not used, one copy of the email is sent for every original recipient.

In certain embodiments, a Deliver to Alternate Host action is supported. The IP address used for the destination mail host for all recipients of the message can be changed to the parameter of this action. The parameter may be an IP address (in a.b.c.d format), or an unresolved hostname. No change is made to the recipient address in the message envelope. The syntax of the action is "alt-mailhost (<hostname>)", where hostname is the machine name (or IP) to connect to for the purposes of transmitting the email.

In other embodiments, a Write Message to Logs action is supported. In this action, a message filter can write the entire message, including the recipient list, to a mail log of the user's choice. The user may choose to use the normal logging facility, or may specify an alternate log to specifically record these events. The syntax of this action is "log (<logname>)", where logname is the name of the file the message should be logged to.

In still other embodiments, a Bcc action is provided, when this action is taken, a complete duplicate of the message received is created, and sent to the designated recipient. The return path on the copy is altered to the empty string, which prevents the original sender from receiving any bounces. The duplicate email is not processed or filtered in any way, so LSMTP-style messages do not have variables replaced or parts assembled in them. The syntax of this action is "bcc (<email>)", where email is the address to which a copy of the email is sent.

In another embodiment, a Notify action is provided; when this action is taken, a new message is composed, containing the colloquial name of the injection filter, the MAIL FROM, RCPT TO, and the message headers of the incoming message that matched on the associated rule. This notification message is sent to a designated recipient, and is not processed or filtered. The syntax of this action is "notify (<email>)", where email is the address to which the notification is sent.

In certain embodiments, some actions are considered "final." If a final action is executed on a message, no further actions in that filter are taken, and no further filters on that message are evaluated. In one embodiment, final actions include "bounce," "abort," and "deliver."

In an "Abort" action, a message filter can abort all message recipients. This action is recorded as an aborted message for mail monitoring purposes. As with all other final actions described herein, no action within the current filter appearing subsequent to this action is executed. No further filters are evaluated against this message if this action is executed. In one embodiment, the syntax of this action is "abort( )". In a Bounce Message action, a message filter can bounce messages according to global bounce configuration settings. In one embodiment, the syntax of this action is "bounce( )". In a Deliver action, a message is enqueued for delivery immediately, with its current data, which may have been altered during the processing of an earlier filter.

4.0 User Interfaces

In one embodiment, a graphical user interface provided by Sender Pages 120A or Admin Pages 120B enables creating, editing, and deleting Injection Filters. Injection filters can be displayed in a ranking order, and the order can be modified. The user can set attribute values include colloquial name, filtering order, receiving Ethernet interface, receiving IP interface, allowed hosts (using allowed hosts notation), MAIL FROM, RCPT TO, message size, and activity status.

Using the interface, IFs can be assigned an action: reject or assign to an existing delivery configuration. If the action is to reject the message, an argument may be provided to be included in the bounce message to the injecting host.

In other embodiments, a command-line interface ("CLI") to Filter Logic 134 and system 106 is provided. Using the CLI, Sender Host 102 or Administrative Host 114 can establish a terminal connection to system 106 and provide character-based commands to the system. A command-line interpreter in system 106 receives, parses and executes the commands using one or more other internal processes of the system. Using the CLI, a user can create, delete, and manipulate individual filters and also import and export filters in an external file. APPENDIX 2 presents an example CLI specification.

5.0 Implementation Mechanisms—Hardware Overview

Figure 5:
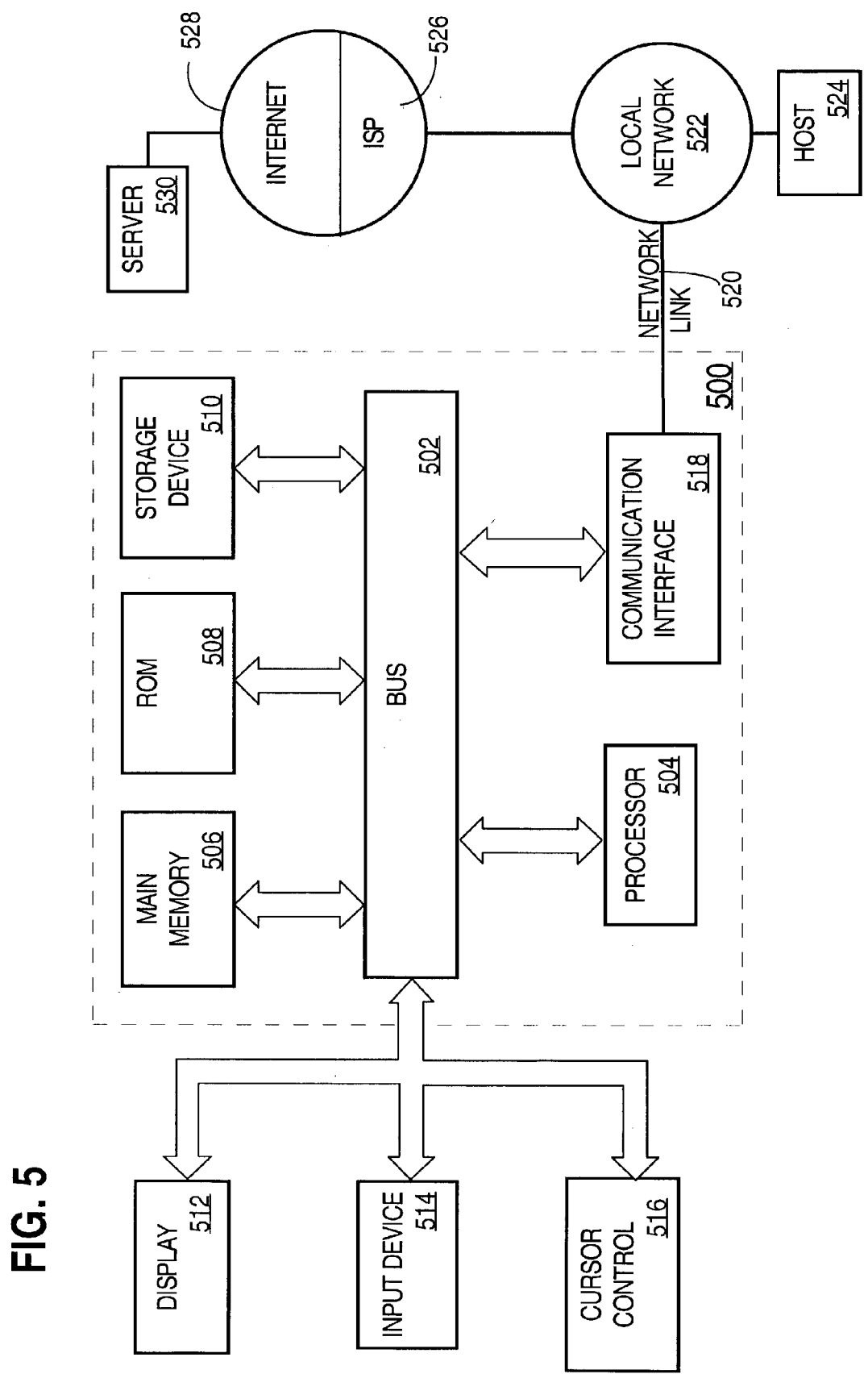
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for electronic message delivery approaches as described herein. According to one embodiment of the invention, electronic message delivery approaches as described herein are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for electronic message delivery approaches as described herein.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. For example, in addition to the filter approach and the Alternate Source Host command approach described above, message processing system 106 can send messages on different outbound interfaces using a round-robin approach to select a particular interface for a particular interface. The specification and drawings are, accordingly, to be regarded in an illustrative rather than a restrictive sense.

Appendix 1—Example Class Definitions

1 Design Details

This section describes example data structures and processing methods for message objects, how a recipient is tagged with information, and how message meta-data is transported, etc.

1.1 Filter Representation

To a user, a filter appears as it would be defined within the FDL. Within the system, a filter is implemented as a data structure that allows the system to efficiently apply a message to the filters defined, as in the following example structure:

```
+------------------------------------------------------------------------------+
| FilterSet                                                                    |
|                                                                              |
|    Data:                                                                     |
|       +--------------------------------------------------+                   |
|       | Filter                                       |-+                     |
|       |                                              | |                     |
|       |   Data:                                      | |                     |
|       |     * Boolean __is__active                   | |                     |
|       |     * Boolean __is__valid                    | |                     |
|       |     * string __name                          | |                     |
|       |       +------------------------------+       | |                     |
|       |       | Rule (polymorphic)           |       | |                     |
|       |       |                              |       | |                     |
|       |       |   Virtual Methods:           |       | |                     |
|       |       |     * eval (Message msg)     |       | |                     |
|       |       |     * name ( )               |       | |                     |
|       |       |     * is__valid ( )          |       | |                     |
|       |       |                              |       | |                     |
|       |       +------------------------------+       | |                     |
|       |                                              | |                     |
|       |       +------------------------------+       | |                     |
|       |       | Action (polymorphic)       |-+       | |                     |
|       |       |                            | |       | |                     |
|       |       |   Virtual Methods:         | |       | |                     |
|       |       |     * apply (Message msg)  | |       | |                     |
|       |       |     * name ( )             | |       | |                     |
|       |       |     * is__valid ( )        | |       | |                     |
|       |       |                            | |       | |                     |
|       |       +----------------------------+ |       | |                     |
|       |         +------------------------------+     | |                     |
|       |            ...                               | |                     |
|       |                                              | |                     |
|       |   Methods:                                   | |                     |
|       |     * process (Message msg)                  | |                     |
|       |     * validate ( )                           | |                     |
|       |     * is__valid ( )                          | |                     |
|       |     * is__active ( )                         | |                     |
|       |     * set__active (Boolean state)            | |                     |
|       |     * name ( )                               | |                     |
|       |                                              | |                     |
|       +--------------------------------------------------+ |                 |
|         +--------------------------------------------------+                 |
|            ...                                                               |
|                                                                              |
|    Methods:                                                                  |
|        * process (Message msg)                                               |
|        * add__filter (Filter new__filter)                                    |
|        * validate ( )                                                        |
|        * get__filter__count ( )                                              |
|        * get__filter (integer index)                                         |
|        * remove__filter (integer index)                                      |
|        * remove__filter (Filter old__filter)                                 |
|        * save ( )                                                            |
|        * load ( )                                                            |
|        * get__FDLs ( )                                                       |
|                                                                              |
+------------------------------------------------------------------------------+
```

1.1.1 Rule Classes

All rules shall be derived from a base rule class, "Rule", which is defined as:

class Rule:

```
def __init__(self):
    """"Base constructor for class Rule."""""
    pass
# The following are 'virtual methods'. They must be overridden by
# any classes that inherit from this base class.
def name (self):
    """"Returns the FDL-syntax representation of the rule."""""
    raise AttributeError, "'Rule' instance has no attribute 'name'"
def eval (self, msg):
```

*-continued*

```
    """"Evaluates the given Message object against the rule.
    <msg>: Reference to the Message object to evaluated.
    Returns 0 if the message does not match, non-zero otherwise."""""
    raise AttributeError, "'Rule' instance has no attribute 'eval'"
def is_valid (self):
    """"Returns 0 if rule is invalid, non-zero otherwise."""""
    raise AttributeError, "'Rule' instance has no attribute 'is__valid'"
```

The methods "eval" and "name" must be implemented by class that inherit from class Rule.

Rules may throw InvalidFilterError exceptions if the filter is marked as active and valid, but is actually invalid. The Filter class containing this rule is responsible for trapping this exception and marking itself invalid.

1.1.1.1 Mail From Rule

This rule attempts to match the message's MAIL FROM data against a regular expression provided by the user. It accepts the FDL-defined wildcarded regular expression as a parameter to its constructor _init_( ), processes it into a compiled regular expression data structure, which is kept cached within the object for future reference.

class MAIL_FROM_Rule (Rule):

```
def _init_(self, mail_from):
    """Constructor for class MAIL_FROM_Rule.
    <pattern>: The regex string to match against."""
    Rule._init_(self)
    self._mail_from_regex = re.compile (mail_from)
    self._mail_from = mail_from
def name (self):
    """Returns FDL-syntax representation of the rule."""
    return "MAIL_FROM_Rule ('%s')" % (self._mail_from)
def eval (self, msg):
    """Returns 0 if the rule matches against the message, 1 otherwise.
    <msg>: Message object to be matched against."""
    if re.match(self._mail_from_regex, msg.get_return_path( )):
        return 1
    else:
        return 0
def is_valid (self):
    """Returns 0 if this rule is invalid, non-zero otherwise."""
    # MAIL FROM is always accessible, so it's always valid.
    return 1
```

1.1.1.2 And Rule

The AND rule is actually the implementation of the Boolean operator "AND". It is instantiated with two rules, "lefthand" and "righthand", which correspond to the left and right sides of the operator.

class AND_Rule:

```
def _init_(self, lefthand, righthand):
    """Constructor for class AND_Rule.
    <lefthand>: The rule to the left of the AND operator
    <righthand>: The rule to the right of the AND operator"""
    if isinstance (lefthand, Rule) and isinstance (righthand, Rule):
        Rule._init_(self)
        self._left = lefthand
        self._right = righthand
    else:
        raise TypeError, "Non-Rule parameter given to AND_Rule"
def name (self):
    """Returns the FDL-syntax representation of the rule."""
    return "(" + self._left.name( ) + " AND " + self._right.name( ) +
")"
def eval (self, msg):
    """Returns 1 if the rule matches against the message, 0 otherwise.
    <msg>: Message object to be matched against."""
    if self._left.eval(msg) and self._right.eval(msg):
        return 1
    return 0
```

Appendix 2—Example Command-Line Interface

2 Command Line Interface

The message filtering functions can use interface commands that are summarized in a table and described in greater detail below.

| | DESCRIPTION |
|---|---|
| COMMAND | |
| Filters | General command, takes arguments as described below. If no arguments are given it puts the user into an interactive mode and ask for more information. |
| SUBCOMMAND | |
| filters add | Adds a filter. If no location is given it will append to the current sequence. Otherwise the filter will be inserted into the specific place in the sequence. |
| filters delete | Deletes a filter by name or by sequence number. |
| filters move | Rearrange the existing filters. |
| filters set | Activates an inactive filter. |
| filters import | Replaces the current set of filters with a new set stored in a file. |
| filters export | Exports the current set of filters to a file. |
| filters list | Lists information about a filter or filters. |
| filters detail | Prints detailed information about a specific filter including the body of the filter rule itself. |
| filters parseheaders | Displays whether or not header parsing will be performed, prompts user to change the setting. |

Usage: filters [filters-args] command [command-args]

Currently there are no filters-args implemented although in the future we may introduce flags to control things such as the verbosity and output formats of the filters commands. This will be particularly helpful when implementing automated interfaces to the filters command.

There are general three types of parameters:

seqnum—An integer representing a filter based on its position in the list of filters. A seqnum of 2 represents the second filter in the list, for example.

filtname—The colloquial name of a filter.

range—A range may be used to represent more than one filter, and appears in the form of "X-Y", where X and Y are the first and last seqnums that identify the extent. "2–4" would represent filters in the second, third, and fourth positions, for example. Either X or Y may be left off to represent an open-ended list. "-4" would represent the first four filters, where as "2-" would represent all filters except the first. A range may also be the keyword 'all', which represents all the filters in the filter list.

2.1 Examples of CLI Commands 2.1.1 Filters Add

Usage: . . . add [seqnum|filtname|last]

Arguments:

seqnum

Specifies the position at which to insert the new filter(s). If ommitted, or given the keyword 'last', the the filters entered in will be appended to the list of filters. No gaps in the sequence numbers are allowed; the user will not be able to enter a seqnum outside the boundaries of the current list. If the user enters an unknown filtname, the user will be prompted to enter a valid filtname, seqnum, or 'last'.

Once entered, the user may manually enter the filter script. When the user is finished, they must terminate the entry by entering a period '.' on a line by itself.

Error Conditions:

Sequence number beyond the current range of sequence numbers.

Filter with a non-unique filtname.

Filter with a filtname that is a reserved word.

Filter with a syntax error.

Filter with actions referring to non-existent system resources such as interfaces.

2.1.2 Filters Delete

Usage: . . . delete [seqnum|filtname|range]
Deletes the filter(s) identified.
Error Conditions:
No filter with a given filtername.
No filter with a given sequence number.

2.1.3 Filters Move

Usage: . . . move seqnum|filtname|range seqnum|last
Moves the filters identified by the first param to the position identified by the second parameter. If the second parameter is the keyword 'last', the filters will be moved to the end of the list of filters. If more than one filter is be moved, their ordering will remain the same in relation to one another.
Error Conditions:
No filter with a given filtername.
No filter with a given sequence number.
Sequence number beyond the current range of sequence numbers.
Movement would result in no change of sequence.

2.1.4 Filters Set

Usage: . . . set seqnum|filtname|range active|inactive
Sets the Filters Identified to Have the Given State. Legal States Are:
active
Set the state of the selected filters to be active.
inactive
Set the state of the selected filters to be inactive.
Error Conditions:
No filter with a given filtname.
No filter with a given sequence number.

2.1.5 Filters Import

Usage: . . . import filename
Arguments:
filename
The name of the file containing filters that should be processed. This file must reside in the "filters" subdirectory of the ftp root directory on the IronPort box. It will be ingested and parsed and any errors reported. The filters imported will replace all filters that exist in the current filter set.
Error Conditions:
File does not exist.
Filter with a non-unique filtname.
Filter with a filtname that is a reserved word.
Filter with a syntax error.
Filter with actions referring to non-existent system resources such as interfaces.

2.1.6 Filters Export

Usage: . . . export filename [seqnum|filtname|range]
Arguments:
filename
Output a formatted version of the existing filterset to a file.
Error Conditions:
No filter with a given filtername.
No filter with a given sequence number.

2.1.7 Filters List

Usage: . . . list [seqnum|filtname|range]
The list function shows summarized information about the identified filters in a tabular form without printing the filter body. The information displayed includes:

Filter name
Filter sequence number
Filter's active/inactive state
Filter's valid/invalid state
Error Conditions:
Illegal range format.

2.1.8 Filters Detail

Usage: . . . detail [seqnum|filtname|range]
The detail command provides full information about the identified filters. This includes the body of the filter and any additional state information including any counters that may be associated with that filter.
Arguments:
range
The range is specified in exactly the same way as for the list command.

2.1.9 Filters Parseheaders

Usage: . . . parseheaders
The parseheaders command allows the user toggle on/off a flag that determines whether or not the system will allow the message headers to parsed. The default is 'off'. When header parsing is disabled, any filter that contains a subject rule becomes invalid.

What is claimed is:

1. A method of sending an electronic message, comprising:

receiving and storing definitions of one or more message filters, wherein each of the one or more message filters comprises a rule and an associated action, wherein the rule specifies a match of a subject or body of the electronic message and the associated action specifies delivering from a specified source hostname when the subject or body of the electronic message matches the rule;

receiving the electronic message destined for one or more recipients;

matching the rules of the one or more message filters to the electronic message; and when the rule of one of the one or more message filters matches the subject or the body of the electronic message, performing the associated action on the electronic message, prior to enqueuing the electronic message for delivery to the one or more recipients, by setting, in the electronic message, a particular source hostname, identified by the matching message filter, from which the electronic message is actually delivered, wherein each of the one or more message filters is associated with a different communication campaign of a sender of the electronic message;

wherein each message filter, of the one or more message filters, for a particular communication campaign specifies a different source hostname; and wherein the steps of storing definitions of the one or more message filters, matching the rules of the message filters, and performing the associated action are performed by a message processing system that acts as a virtual gateway for the sender by receiving bulk messages from the sender, processing the bulk messages according to the one or more message filters and dispatching the bulk messages to receivers or recipients using a plurality of different source hostnames as specified by the sender in the one or more message filters.

2. A method as recited in claim 1, wherein the associated action further specifies identifies an interface name, and wherein performing the associated action further comprises:
   determining the particular source hostname that is associated with the specified interface;
   creating a delivery queue that is uniquely associated with a destination domain of the electronic message, the specified interface, and the particular source hostname; and
   enqueuing the electronic message in the delivery queue.

3. A method as recited in claim 1, wherein the associated action identifies the particular source hostname, and wherein performing the associated action further comprises setting, in the electronic message, a "received by" message header equal to the particular source hostname.

4. A method as recited in claim 1, wherein the associated action further specifies delivering to an alternate e-mail address, wherein the associated action further identifies a delivery address, and wherein performing the associated action further comprises setting, in the electronic message, a RCPT TO element as equal to the alternate e-mail address.

5. A method as recited in claim 4, wherein the associated action further specifies a copy count value, and wherein performing the associated action further comprises sending, to the alternate e-mail address, a number of copies of the electronic message equal to a number of original recipients of the electronic message.

6. A method as recited in claim 1, wherein the associated action further specifies delivering to an alternate host, wherein the associated action further identifies a particular destination hostname, and wherein performing the associated action further comprises setting, in the electronic message, a destination mail host address for all recipients of the electronic message equal to the particular destination hostname.

7. A method as recited in claim 1, wherein the associated action further identifies a notification address, and wherein performing the associated action further comprises:
   creating an electronic notification comprising information identifying the matching message filter, address information from the electronic message, and header information from the electronic message; and
   sending the electronic notification to the notification address.

8. A method as recited in claim 1, wherein each of the one or more message filters conforms to a grammar that, when described in Backus-Naur Form, is equivalent to:

| | |
|---|---|
| Filterset :: | Filter Filterset |
| | Filter |
| Filter :: | Filtname Filterbody |
| | Filtbody |
| Filterset :: | Filter Filterset |
| | Filter |
| Filter :: | filtname : Filterbody |
| | Filterbody |
| Filterbody :: | "if" Expr '{' Statement-list '}' |
| | "if" Expr '{' Statement-list '}' "else" |
| | '{' Statement-list '}' |
| Statement-list :: | Statement-list Statement |
| | Statement |
| Statement :: | Action ';' |
| | Filter |
| Expr :: | Expr "or" Term |
| | Term |
| Term :: | Term "and" Factor |
| | Factor |
| Factor :: | "not" ExprCore \| ExprCore |
| ExprCore :: | Comparison |
| | '(' Expr ')' |
| | "true" |
| Comparison :: | Param Relop val |
| Param :: | "recv-int" \| "recv-inj" \| "remote-ip" \| "mail-from" \| "rcpt-to" \| "subject" \| "body-size" |
| Relop :: | "==" \| ">" \| ">=" \| "<” \|"<=" \| ">" |
| Action :: | "alt-src-host" '(' qstr , qstr ')' |
| | "alt-rcpt-to" '(' qstr ')' |
| | "alt-mailhost" '(' qstr ')' |
| | "abort" '(' ')' |
| | "bounce" '(' ')' |
| | "deliver" '(' ')' |
| | "notify" '(' qstr ')' |
| | "bcc" '(' qstr ')' |
| filtname | [_A–Za–z]([_A–Za–z0–76]\|'-')* |
| qstr | quoted string. |

9. A method as recited in claim 1, wherein each of the one or more message filters is associated with a different communication campaign of a sender of the electronic message.

10. A method as recited in claim 1, wherein the steps of storing definitions of the one or more message filters, matching the rules of the message filters, and performing the associated action are performed by a message processing system that receives bulk messages from senders, processes the bulk messages according to the message filters, and dispatches the bulk messages to receivers or recipients.

11. A method as recited in claim 1, wherein a domain name server, accessible to a recipient of the one or more recipients of the electronic message, recognizes the particular source hostname.

12. A method as recited in claim 1, further comprising:
   storing information about a network address of two or more sources for the electronic message, wherein each of said two or more sources are recognized by a domain name server, and wherein each of the two or more sources identifies the same physical machine.

13. A method as recited in claim 1, further comprising:
   in response to receiving a notification that an inbound messaging gateway, associated with a recipient of the electronic message, is blocking receipt of the electronic message, performing one or more of the following actions: cease attempting to delivery the electronic message and attempting to delivery the electronic message using a new delivery policy.

14. A method as recited in claim 1, wherein the rule is defined at a particular policy level, and wherein the policy level is based, at least in part, on at least one of the following: a recipient of the electronic message, a sender of the electronic message, and a campaign associated with the electronic message.

15. A computer-readable storage medium carrying one or more sequences of instructions for sending an electronic message, which when executed by one or more processors, cause:
   receiving and storing definitions of one or more message filters, wherein each of the one or more message filters comprises a rule and an associated action,
   wherein the rule specifies a match of a subject or body of the electronic message and the associated action specifies delivering from a specified source hostname when the subject or body of the electronic message matches the rule;
   receiving the electronic message destined for one or more recipients;

matching the rules of the one or more message filters to the electronic message; and when the rule of one of the one or more message filters matches the subject or the body of the electronic message, performing the associated action on the electronic message, prior to enqueuing the electronic message for delivery to the one or more recipients, by setting, in the electronic message, a particular source hostname, identified by the matching message filter, from which the electronic message is actually delivered, wherein each of the one or more message filters is associated with a different communication campaign of a sender of the electronic message;

wherein each message filter, of the one or more message filters, for a particular communication campaign specifies a different source hostname; and wherein the steps of storing definitions of the one or more message filters, matching the rules of the message filters, and performing the associated action are performed by a message processing system that acts as a virtual gateway for the sender by receiving bulk messages from the sender, processing the bulk messages according to the one or more message filters and dispatching the bulk messages to receivers or recipients using a plurality of different source hostnames as specified by the sender in the one or more message filters.

16. A computer-readable storage medium as recited in claim 15, wherein the associated action further specifies identifies an interface name, and wherein performing the associated action further comprises:

determining the particular source hostname that is associated with the specified interface;

creating a delivery queue that is uniquely associated with a destination domain of the electronic message, the specified interface, and the particular source hostname; and enqueuing the electronic message in the delivery queue.

17. A computer-readable storage medium as recited in claim 15, wherein the associated action identifies the particular source hostname, and wherein performing the associated action further comprises setting, in the electronic message, a "received by" message header equal to the particular source hostname.

18. A computer-readable storage medium as recited in claim 15, wherein the associated action further specifies delivering to an alternate e-mail address, wherein the associated action further identifies a delivery address, and wherein performing the associated action further comprises setting, in the electronic message, a RCPT TO element as equal to the alternate e-mail address.

19. A computer-readable storage medium as recited in claim 18, wherein the associated action further specifies a copy count value, and wherein performing the associated action further comprises sending, to the alternate e-mail address, a number of copies of the electronic message equal to a number of original recipients of the electronic message.

20. A computer-readable storage medium as recited in claim 15, wherein the associated action further specifies delivering to an alternate host, wherein the associated action further identifies a particular destination hostname, and wherein performing the associated action further comprises setting, in the electronic message, a destination mail host address for all recipients of the electronic message equal to the particular destination hostname.

21. A computer-readable storage medium as recited in claim 15, wherein the associated action further identifies a notification address, and wherein performing the associated action further comprises:

creating an electronic notification comprising information identifying the matching message filter, address information from the electronic message, and header information from the electronic message; and sending the electronic notification to the notification address.

22. A computer-readable storage medium as recited in claim 15, wherein each of the one or more message filters conforms to a grammar that, when described in Backus-Naur Form, is equivalent to:

| | |
|---|---|
| Filterset :: | Filter Filterset |
| | Filter |
| Filter :: | Filtname Filterbody |
| | Filtbody |
| Filterset :: | Filter Filterset |
| | Filter |
| Filter :: | flitname : Filterbody |
| | Filterbody |
| Filterbody :: | "if" Expr '{' Statement-list '}' |
| | "if" Expr '{' Statement-list '}' "else" |
| | '{' Statement-list '}' |
| Statement-list :: | Statement-list Statement |
| | Statement |
| Statement :: | Action ';' |
| | Filter |
| Expr :: | Expr "or" Term |
| | Term |
| Term :: | Term "and" Factor |
| | Factor |
| Factor :: | "not" ExprCore \| ExprCore |
| ExprCore :: | Comparison |
| | '(' Expr ')' |
| | "true" |
| Comparison :: | Param Relop val |
| Param :: | "recv-int" \| "recv-inj" \| "remote-ip" \| "mail-from" \| "rcpt-to" \| "subject" \| "body-size" |
| Relop :: | "==" \| ">" \| ">=" \| "<” \|"<=" \| ">" |
| Action :: | "alt-src-host" '(' qstr , qstr ')' |
| | "alt-rcpt-to" '(' qstr ')' |
| | "alt-mailhost" '(' qstr ')' |
| | "abort" '(' ')' |
| | "bounce" '(' ')' |
| | "deliver" '(' ')' |
| | "notify" '(' qstr ')' |
| | "bcc" '(' qstr ')' |
| filtname | [_A–Za–z]([_A–Za–z0–91]\|'-')* |
| qstr | quoted string. |

23. A computer-readable storage medium as recited in claim 15, wherein each of the one or more message filters is associated with a different communication campaign of a sender of the electronic message.

24. A computer-readable storage medium as recited in claim 15, wherein the steps of storing definitions of the one or more message filters, matching the rules of the message filters, and performing the associated action are performed by a message processing system that receives bulk messages from senders, processes the bulk messages according to the message filters, and dispatches the bulk messages to receivers or recipients.

25. A computer-readable storage medium as recited in claim 15, wherein a domain name server, accessible to a recipient of the one or recipients of the electronic message, recognizes the particular source hostname.

26. A computer-readable storage medium as recited in claim 15, wherein execution of the one or more stored sequences of instructions further cause:

storing information about a network address of two or more sources for the electronic message, wherein each of said two or more sources are recognized by a domain name server, and wherein each of the two or more sources identifies the same physical machine.

27. A computer-readable storage medium as recited in claim 15, wherein execution of the one or more stored sequences of instructions further cause:

in response to receiving a notification that an inbound messaging gateway, associated with a recipient of the electronic message, is blocking receipt of the electronic message, performing one or more of the following actions: cease attempting to delivery the electronic message and attempting to delivery the electronic message using a new delivery policy.

28. A computer-readable storage medium as recited in claim 15, wherein the rule is defined at a particular policy level, and wherein the policy level is based, at least in part, on at least one of the following: a recipient of the electronic message, a sender of the electronic message, and a campaign associated with the electronic message.

29. An apparatus for sending an electronic message, comprising:

means for receiving and storing definitions of one or more message filters, wherein each of the one or more message filters comprises a rule and an associated action, wherein the rule specifies a match of a subject or body of the electronic message and the associated action specifies delivering from a specified source hostname when the subject or body of the electronic message matches the rule;

means for receiving the electronic message destined for one or more recipients;

means for matching the rules of the one or more message filters to the electronic message; and means for, when the rule of one of the one or more message filters matches the subject or the body of the electronic message, performing the associated action on the electronic message, prior to enqueuing the electronic message for delivery to the one or more recipients, by setting, in the electronic message, a particular source hostname, identified by the matching message filter, from which the electronic message is actually delivered, wherein each of the one or more message filters is associated with a different communication campaign of a sender of the electronic message;

wherein each message filter, of the one or more message filters, for a particular communication campaign specifies a different source hostname; and wherein the means for storing definitions of the one or more message filters, means for matching the rules of the message filters, and means for performing the associated action are comprised within a message processing system that acts as a virtual gateway for the sender by receiving bulk messages from the sender, wherein the message processing system further comprises means for processing the bulk messages according to the one or more message filters and means for dispatching the bulk messages to receivers or recipients using a plurality of different source hostnames as specified by the sender in the one or more message filters.

30. An apparatus as recited in claim 29, wherein the associated action further specifies identifies an interface name, and wherein the means for performing the associated action comprises:

means for determining the particular source hostname that is associated with the specified interface;

means for creating a delivery queue that is uniquely associated with a destination domain of the electronic message, the specified interface, and the particular source hostname; and means for enqueuing the electronic message in the delivery queue.

31. An apparatus as recited in claim 29, wherein the associated action identifies the particular source hostname, and wherein the means for performing the associated action comprises means for setting, in the electronic message, a "received by" message header equal to the particular source hostname.

32. An apparatus as recited in claim 29, wherein the associated action further specifies delivering to an alternate e-mail address, wherein the associated action further identifies a delivery address, and wherein the means for performing the associated action comprises means for setting, in the electronic message, a RCPT TO element as equal to the alternate e-mail address.

33. An apparatus as recited in claim 32, wherein the associated action further specifies a copy count value, and wherein the means for performing the associated action comprises means for sending, to the alternate e-mail address, a number of copies of the electronic message equal to a number of original recipients of the electronic message.

34. An apparatus as recited in claim 29, wherein the associated action further specifies delivering to an alternate host, wherein the associated action further identifies a particular destination hostname, and wherein the means for performing the associated action comprises means for setting, in the electronic message, a destination mail host address for all recipients of the electronic message equal to the particular destination hostname.

35. An apparatus as recited in claim 29, wherein the associated action further identifies a notification address, and wherein the means for performing the associated action comprises:

means for creating an electronic notification comprising information identifying the matching message filter, address information from the electronic message, and header information from the electronic message; and means for sending the electronic notification to the notification address.

36. An apparatus as recited in claim 29, wherein each of the one or more message filters conforms to a grammar that, when described in Backus-Naur Form, is equivalent to:

| Filterset :: | Filter Filterset |
| | Filter |
| Filter :: | Filtname Filterbody |
| | Filtbody |
| Filterset :: | Filter Filterset |
| | Filter |
| Filter :: | filtname : Filterbody |
| | Filterbody |
| Filterbody :: | "if" Expr '{' Statement-list '}' |
| | "if" Expr '{' Statement-list '}' "else" |
| | '{' Statement-list '}' |

-continued

| | |
|---|---|
| Statement-list :: | Statement-list Statement |
| | Statement |
| Statement :: | Action ';' |
| | Filter |
| Expr :: | Expr "or" Term |
| | Term |
| Term :: | Term "and" Factor |
| | Factor |
| Factor :: | "not" ExprCore \| ExprCore |
| ExprCore :: | Comparison |
| | '(' Expr ')' |
| | "true" |
| Comparison :: | Param Relop val |
| Param :: | "recv-int" \| "recv-inj" \| "remote-ip" \| "mail-from" \| "rcpt-to" \| "subject" \| "body-size" |
| Relop :: | "==" \| ">" \| ">=" \| "<” \|"<=" \| ">" |
| Action :: | "alt-src-host" '(' qstr , qstr ')' |
| | "alt-rcpt-to" '(' qstr ')' |
| | "alt-mailhost" '(' qstr ')' |
| | "abort" '(' ')' |
| | "bounce" '(' ')' |
| | "deliver" '(' ')' |
| | "notify" '(' qstr ')' |
| | "bcc" '(' qstr ')' |
| filtname | [_A–Za–z]([_A–Za–z0–106]\|'-')* |
| qstr | quoted string. |

37. An apparatus as recited in claim 29, wherein each of the one or more message filters is associated with a different communication campaign of a sender of the electronic message.

38. An apparatus as recited in claim 29, wherein the means for storing definitions of the one or more message filters, the means for matching the rules of the message filters, and the means for performing the associated action are comprised within a message processing system that further comprises means for receives bulk messages from senders, means for processing the bulk messages according to the message filters, and means for dispatching the bulk messages to receivers or recipients.

39. An apparatus as recited in claim 29, wherein a domain name server, accessible to a recipient of the one or more recipients of the electronic message, recognizes the particular source hostname.

40. An apparatus as recited in claim 29, further comprising:
means for storing information about a network address of two or more sources for the electronic message, wherein each of said two or more sources are recognized by a domain name server, and wherein each of the two or more sources identifies the same physical machine.

41. An apparatus as recited in claim 29, further comprising:
means for, in response to receiving a notification that an inbound messaging gateway, associated with a recipient of the electronic message, is blocking receipt of the electronic message, performing one or more of the following actions: cease attempting to delivery the electronic message and attempting to delivery the electronic message using a new delivery policy.

42. An apparatus as recited in claim 29, wherein the rule is defined at a particular policy level, and wherein the policy level is based, at least in part, on at least one of the following: a recipient of the electronic message, a sender of the electronic message, and a campaign associated with the electronic message.

43. An apparatus for sending an electronic message, comprising:

a network interface that is coupled to a data network for receiving one or more packet flows therefrom;
a processor; and
a computer-readable storage medium storing one or more stored sequences of instructions which, when executed by the processor, cause:
receiving and storing definitions of one or more message filters, wherein each of the one or more message filters comprises a rule and an associated action,
wherein the rule specifies a match of a subject or body of the electronic message and the associated action specifies delivering from a specified source hostname when the subject or body of the electronic message matches the rule;
receiving the electronic message destined for one or more recipients;
matching the rules of the one or more message filters to the electronic message; and
when the rule of one of the one or more message filters matches the subject or the body of the electronic message, performing the associated action on the electronic message, prior to enqueuing the electronic message for delivery to the one or more recipients, by setting, in the electronic message, a particular source hostname, identified by the matching message filter, from which the electronic message is actually delivered,
wherein each of the one or more message filters is associated with a different communication campaign of a sender of the electronic message;
wherein each message filter, of the one or more message filters, for a particular communication campaign specifies a different source hostname; and
wherein the steps of storing definitions of the one or more message filters, matching the rules of the message filters, and performing the associated action are performed by a message Processing system that acts as a virtual gateway for the sender by receiving bulk messages from the sender, processing the bulk messages according to the one or more message filters and dispatching the bulk messages to receivers or recipients using a plurality of different source hostnames as specified by the sender in the one or more message filters.

44. An apparatus as recited in claim 43, wherein the associated action further specifies identifies an interface name, and wherein performing the associated action further comprises:
determining the particular source hostname that is associated with the specified interface;
creating a delivery queue that is uniquely associated with a destination domain of the electronic message, the specified interface, and the particular source hostname; and
enqueuing the electronic message in the delivery queue.

45. An apparatus as recited in claim 43, wherein the associated action identifies the particular source hostname, and wherein performing the associated action further comprises setting, in the electronic message, a "received by" message header equal to the particular source hostname.

46. An apparatus as recited in claim 43, wherein the associated action further specifies delivering to an alternate e-mail address, wherein the associated action further identifies a delivery address, and wherein performing the associated action further comprises setting, in the electronic message, a RCPT TO element as equal to the alternate e-mail address.

47. An apparatus as recited in claim 46, wherein the associated action further specifies a copy count value, and wherein performing the associated action further comprises sending, to the alternate e-mail address, a number of copies of the electronic message equal to a number of original recipients of the electronic message.

48. An apparatus as recited in claim 43, wherein the associated action further specifies delivering to an alternate host, wherein the associated action further identifies a particular destination hostname, and wherein performing the associated action further comprises setting, in the electronic message, a destination mail host address for all recipients of the electronic message equal to the particular destination hostname.

49. An apparatus as recited in claim 43, wherein the associated action further identifies a notification address, and wherein performing the associated action further comprises:
  creating an electronic notification comprising information identifying the matching message filter, address information from the electronic message, and header information from the electronic message; and
  sending the electronic notification to the notification address.

50. An apparatus as recited in claim 43, wherein each of the one or more message filters conforms to a grammar that, when described in Backus-Naur Form, is equivalent to:

| | |
|---|---|
| Filterset :: | Filter Filterset |
| | Filter |
| Filter :: | Filtname Filterbody |
| | Filtbody |
| Filterset :: | Filter Filterset |
| | Filter |
| Filter :: | filtname : Filterbody |
| | Filterbody |
| Filterbody :: | "if" Expr '{' Statement-list '}' |
| | "if" Expr '{' Statement-list '}' "else" |
| | '{' Statement-list '}' |
| Statement-list :: | Statement-list Statement |
| | Statement |
| Statement :: | Action ';' |
| | Filter |
| Expr :: | Expr "or" Term |
| | Term |
| Term :: | Term "and" Factor |
| | Factor |
| Factor :: | "not" ExprCore \| ExprCore |
| ExprCore :: | Comparison |
| | '(' Expr ')' |
| | "true" |
| Comparison :: | Param Relop val |
| Param :: | "recv-int" \| "recv-inj" \| "remote-ip" \| "mail-from" \| |
| | "rcpt-to" \| "subject" \| "body-size" |
| Relop :: | "==" \| ">" \| ">=" \| "” \|"<=" \| ">" |
| Action :: | "alt-src-host" '(' qstr , qstr ')' |
| | "alt-rcpt-to" '(' qstr ')' |
| | "alt-mailhost" '(' qstr ')' |
| | "abort" '(' ')' |
| | "bounce" '(' ')' |
| | "deliver" '(' ')' |
| | "notify" '(' qstr ')' |
| | "bcc" '(' qstr ')' |
| filtname | [_A–Za–z]([_A–Za–z0–121]\|'-')* |
| qstr | quoted string. |

51. An apparatus as recited in claim 43, wherein each of the one or more message filters is associated with a different communication campaign of a sender of the electronic message.

52. An apparatus as recited in claim 43, wherein the steps of storing definitions of the one or more message filters, matching the rules of the message filters, and performing the associated action are performed by a message processing system that receives bulk messages from senders, processes the bulk messages according to the message filters, and dispatches the bulk messages to receivers or recipients.

53. An apparatus as recited in claim 43, wherein a domain name server, accessible to a recipient of the one or more recipients of the electronic message, recognizes the particular source hostname.

54. An apparatus as recited in claim 43, wherein execution of the one or more stored sequences of instructions further cause:
  storing information about a network address of two or more sources for the electronic message, wherein each of said two or more sources are recognized by a domain name server, and wherein each of the two or more sources identifies the same physical machine.

55. An apparatus as recited in claim 43, wherein execution of the one or more stored sequences of instructions further cause:
  in response to receiving a notification that an inbound messaging gateway, associated with a recipient of the electronic message, is blocking receipt of the electronic message, performing one or more of the following actions: cease attempting to delivery the electronic message and attempting to delivery the electronic message using a new delivery policy.

56. An apparatus as recited in claim 43, wherein the rule is defined at a particular policy level, and wherein the policy level is based, at least in part, on at least one of the following: a recipient of the electronic message, a sender of the electronic message, and a campaign associated with the electronic message.

* * * * *